(12) United States Patent
Matsubara et al.

(10) Patent No.: US 7,998,021 B2
(45) Date of Patent: Aug. 16, 2011

(54) CONTROL APPARATUS AND CONTROL METHOD FOR VEHICULAR DRIVE APPARATUS

(75) Inventors: Tooru Matsubara, Toyota (JP); Yuji Iwase, Mishima (JP); Hiroyuki Shibata, Toyota (JP); Atsushi Tabata, Okazaki (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 885 days.

(21) Appl. No.: 11/987,257

(22) Filed: Nov. 28, 2007

(65) Prior Publication Data

US 2008/0132379 A1  Jun. 5, 2008

(30) Foreign Application Priority Data

Dec. 5, 2006 (JP) .................................. 2006-328714

(51) Int. Cl.
 *B60K 1/02* (2006.01)
(52) U.S. Cl. ........................................................... 477/3
(58) Field of Classification Search ........................ 477/3
 See application file for complete search history.

(56) References Cited

U.S. PATENT DOCUMENTS

2009/0017984 A1 * 1/2009 Shibata et al. ..................... 477/3

FOREIGN PATENT DOCUMENTS

| JP | A-9-308009 | 11/1997 |
|---|---|---|
| JP | A-2004-208417 | 7/2004 |
| JP | A-2004-225573 | 8/2004 |
| JP | A-2006-213149 | 8/2006 |
| JP | A-2006-306210 | 11/2006 |
| JP | A-2006-315484 | 11/2006 |
| JP | B2-4234710 | 3/2009 |

OTHER PUBLICATIONS

Office Action issued in German Patent Application No. 10 2007 055 701.0-51 dated Oct. 13, 2010 (with translation).
Apr. 19, 2011 Office Action issued in Japanese Patent Application No. 2006-328714 (with partial translation).

* cited by examiner

*Primary Examiner* — Dirk Wright
(74) *Attorney, Agent, or Firm* — Oliff & Berridge, PLC

(57) ABSTRACT

A control method for a vehicular drive apparatus that includes a driving power source that includes an engine and a motor, and a shift portion provided in a power transmission path from the driving power source to a drive wheel, includes staring the engine by executing an engine speed control that increases an engine speed to a predetermined engine speed or higher, and executing an engine torque generation control that generates engine torque by supplying fuel and igniting the fuel at the predetermined engine speed or higher. In the case where the controller determines that the period during which the shift of the shift portion is performed overlaps the period during which the engine is started, the engine is started by executing the engine speed control during the shift of the shift portion, and executing the engine torque generation control after the shift of the shift portion is completed.

21 Claims, 10 Drawing Sheets

FIG.2

|  | C1 | C2 | B1 | B2 | B3 | SPEED RATIO | STEP |
|---|---|---|---|---|---|---|---|
| 1st | O |  |  |  | O | 3.357 | 1.54 |
| 2nd | O |  |  | O |  | 2.180 | 1.53 |
| 3rd | O |  | O |  |  | 1.424 | 1.42 |
| 4th | O | O |  |  |  | 1.000 | TOTAL 3.36 |
| R |  | O |  |  | O | 3.209 | |
| N |  |  |  |  |  |  | |

CIRCLE: ENGAGED

CONTROL APPARATUS AND CONTROL METHOD FOR VEHICULAR DRIVE APPARATUS

INCORPORATION BY REFERENCE

The disclosure of Japanese Patent Applications No. 2006-328714 filed on Dec. 5, 2006, including the specification, drawings and abstract is incorporated herein by reference in its entirety.

BACKGROUND OF THE INVENTION

1. Field of the Invention

The invention relates to a control apparatus and a control method for a vehicular drive apparatus that includes a driving power source that includes an engine and a motor, and a shift portion that transmits power output from the driving power source to a drive wheel. More specifically, the invention relates to a technology for controlling the start of an engine.

2. Description of the Related Art

A control apparatus for a vehicular drive apparatus is available. The vehicular drive apparatus includes a driving power source that includes an engine and a motor, and a shift portion that transmits power output from the driving power source to a drive wheel. The control apparatus executes an engine speed control that increases an engine speed to a predetermined engine speed (for example, a self-operating speed at which the engine is completely self-operating) or higher, and executes an engine torque generation control that generates engine torque by supplying fuel and igniting the fuel at the predetermined engine speed or higher.

In the control apparatus for the vehicular drive apparatus, for example, if an accelerator pedal is depressed when a vehicle is driven in a motor-driven mode using only the motor as the driving power source, the period during which the power-on downshift of the shift portion is performed overlaps the period during which the engine is started, in some cases. In the cases, a shift control and the engine start control need to be executed taking into account, for example, fluctuations of torque due to the start of the engine. Thus, these controls are made complicated. Therefore, shift shock and engine start shock may be increased.

Accordingly, Japanese Patent Application Publication No. 2004-208417 (JP-A-2004-208417) describes a technology in which, in the case where it is determined that the period during which the shift of the shift portion is performed overlaps the period during which the engine is started, a shift determination is canceled, that is, the shift is not performed until the process of starting the engine is completed. This suppresses an increase in the shift shock or the engine start shock.

Japanese Patent Application Publication No. 2006-213149 (JP-A-2006-213149) describes a control apparatus for a vehicular drive apparatus. The vehicular drive apparatus includes a differential portion and a stepped shift portion. The differential portion includes a first element connected to an engine, a second element connected to a first motor, and a third element connected to a transmitting member and a second motor. The differential portion distributes output from the engine to the first motor and the transmitting member. The stepped shift portion is provided in a power transmission path from the transmitting member to a drive wheel. The control apparatus increases an engine speed to a predetermined engine speed or higher by making the first motor function as the starter, and generates engine torque by supplying fuel and igniting the fuel at the predetermined engine speed or higher, and thus starts the engine.

In the control apparatus for the vehicular drive apparatus described in the publication No. 2006-213149, the reaction torque transmitted from the drive wheel and borne by the transmitting member is decreased during the shift of the shift portion. In other words, the reaction force for increasing the engine speed is decreased. Thus, in the case where the period during which the shift of the shift portion is performed overlaps the period during which the engine is started, the torque balance between elements of the differential portion needs to be maintained while controlling the engine speed to start the engine. This makes the controls more complicated. Thus, the shift shock or the engine start shock may be further increased.

Accordingly, the publication No. 2006-213149 describes a technology in which, in the case where it is determined that the period during which the shift of the shift portion is performed overlaps the period during which the engine is started, the engine start control is started after the shift of the shift portion is completed, or the shift control for the shift portion is started after the engine is started.

However, in the case where the engine start control is started after the shift of the shift portion is completed, or the shift control for the shift portion is started after the engine is started, the period from when a driver requests acceleration until when required driving power is output, that is, the period required to increase the torque (i.e., sum of the period required to perform the shift, and the period required to start the engine) is increased. This may deteriorate acceleration feeling. Thus, a technology for suppressing the shock due to the start of the engine, and quickly generating the engine torque has not been proposed.

SUMMARY OF THE INVENTION

The invention provides a control apparatus and a control method for a vehicular drive apparatus, which suppress shock due to start of an engine, and quickly generate engine torque in the case where it is determined that the period during which the shift of a shift portion is performed overlaps the period during which an engine is started.

A first aspect of the invention relates to a control apparatus for a vehicular drive apparatus that includes a driving power source that includes an engine and a motor, and a shift portion provided in a power transmission path from the driving power source to a drive wheel. The control apparatus includes a controller that starts the engine by executing an engine speed control that increases an engine speed to a predetermined engine speed or higher, and executing an engine torque generation control that generates engine torque by supplying fuel and igniting the fuel at the predetermined engine speed or higher. In the case where the controller determines that the period during which the shift of the shift portion is performed overlaps the period during which the engine is started, the controller starts the engine by executing the engine speed control during the shift of the shift portion, and executing the engine torque generation control after the shift of the shift portion is completed.

Another aspect of the invention relates to a control method for a vehicular drive apparatus that includes a driving power source that includes an engine and a motor, and a shift portion provided in a power transmission path from the driving power source to a drive wheel. The control method includes starting the engine by executing an engine speed control that increases an engine speed to a predetermined engine speed or higher, and executing an engine torque generation control that generates engine torque by supplying fuel and igniting the fuel at the predetermined engine speed or higher. In the case where it is determined that the period during which the shift of the shift portion is performed overlaps the period during which the engine is started, the engine is started by executing the engine speed control during the shift of the shift portion, and executing the engine torque generation control after the shift of the shift portion is completed.

In the control apparatus and the control method for the vehicular drive apparatus, in the case where it is determined that the period during which the shift of the shift portion is performed overlaps the period during which the engine is started, the engine is started by executing the engine speed control during the shift of the shift portion and executing the engine torque generation control after the shift of the shift portion is completed. Therefore, although the engine speed is increased to the predetermined engine speed or higher during the shift of the shift portion, the engine torque is generated after the shift of the shift portion is completed. Thus, it is possible to suppress shock due to the start of the engine, and to quickly generate engine torque.

Another aspect of the invention relates to a control apparatus for a vehicular drive apparatus that includes a differential portion and a shift portion, wherein the differential portion includes a differential mechanism that includes a first element connected to an engine, a second element connected to a first motor, and a third element connected to a transmitting member and a second motor, the differential mechanism distributes output from the engine to the first motor and the transmitting member, and the shift portion is provided in a power transmission path from the transmitting member to a drive wheel. The control apparatus includes a controller that starts the engine by executing an engine speed control that increases an engine speed to a predetermined engine speed or higher by controlling at least one of the first motor and the second motor, and executing an engine torque generation control that generates engine torque by supplying fuel and igniting the fuel at the predetermined engine speed or higher. In the case where the controller determines that the period during which the shift of the shift portion is performed overlaps the period during which the engine is started, the controller starts the engine by executing the engine speed control during the shift of the shift portion, and executing the engine torque generation control after the shift of the shift portion is completed.

Another aspect of the invention relates to a control method for a vehicular drive apparatus that includes a differential portion and a shift portion, wherein the differential portion includes a differential mechanism that includes a first element connected to an engine, a second element connected to a first motor, and a third element connected to a transmitting member and a second motor; the differential mechanism distributes output from the engine to the first motor and the transmitting member, and the shift portion is provided in a power transmission path from the transmitting member to a drive wheel. The control method includes starting the engine by executing an engine speed control that increases an engine speed to a predetermined engine speed or higher by controlling at least one of the first motor and the second motor, and executing an engine torque generation control that generates engine torque by supplying fuel and igniting the fuel at the predetermined engine speed or higher. In the case where it is determined that the period during which the shift of the shift portion is performed overlaps the period during which the engine is started, the engine is started by executing the engine speed control during the shift of the shift portion, and executing the engine torque generation control after the shift of the shift portion is completed.

In the control apparatus and the control method for the vehicular drive apparatus, in the case where it is determined that the period during which the shift of the shift portion is performed overlaps the period during which the engine is started, the engine is started by executing the engine speed control during the shift of the shift portion and executing the engine torque generation control after the shift of the shift portion is completed. Therefore, although the engine speed is increased to the predetermined engine speed or higher during the shift of the shift portion, the engine torque is generated after the shift of the shift portion is completed. Thus, it is possible to suppress shock due to the start of the engine, and to quickly generate engine torque.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein:

FIG. 2 is an operation table explaining the combinations of operations of hydraulic frictional engagement devices used in the shift operation of the drive apparatus in FIG. 1;

DETAILED DESCRIPTION OF EMBODIMENTS

In the following description and the accompanying drawings, the invention will be described in more detail with reference to embodiments.

Figure 1:
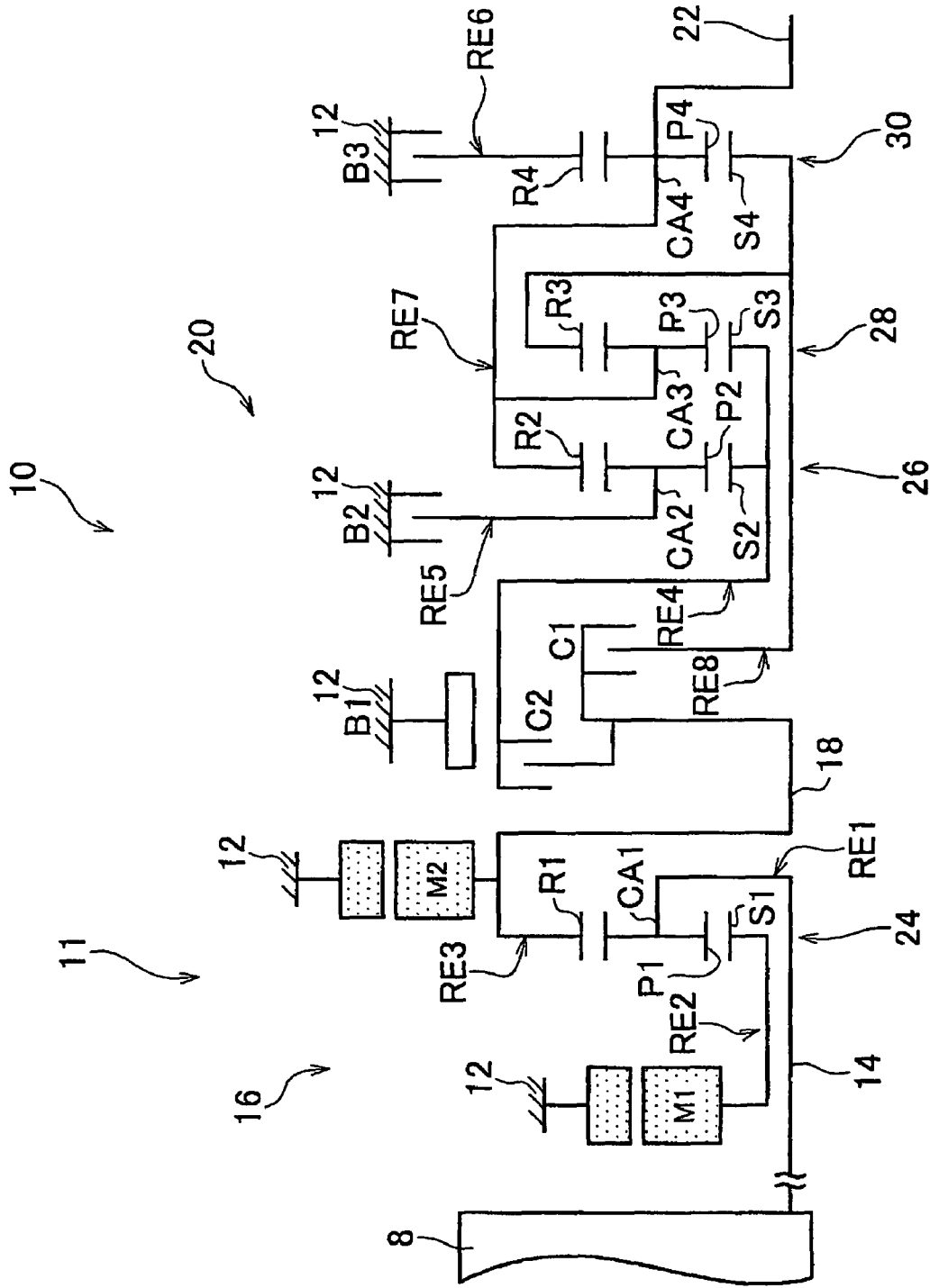
FIG. 1 is a schematic diagram explaining the configuration of a drive apparatus for a hybrid vehicle, according to an embodiment of the invention.

A control apparatus for a vehicular drive apparatus according to an embodiment will be described. FIG. 1 is a schematic diagram explaining a shift mechanism 10 that constitutes a part of a drive apparatus for a hybrid vehicle to which the invention is applied. In FIG. 1, the shift mechanism 10 includes an input shaft 14, a differential portion 11, an automatic shift portion 20, and an output shaft 22 that are provided in series on a common axis in a transmission case hereinafter, simply referred to as "case") 12. The transmission case 12, which is a non-rotational member, is fitted to a vehicle body. The input shaft 14 is an input rotational member. The differential portion 11, which is a CVT portion, is directly connected to the input shaft 14, or indirectly connected to the input shaft 14 via a pulsation absorption damper (i.e., a vibration-damping device; not shown) or the like. The automatic shift portion 20 is a power transmission portion. The automatic shift portion 20 is provided in a power transmission path between the differential portion 11 and drive wheels 34 (refer to FIG. 7), and directly connected to the differential portion 11 via a transmitting member (transmitting shaft) 18. The output shaft 22, which is an output rotational member, is connected to the automatic shift portion 20. For example, the shift mechanism 10 is provided in a front-engine rear-wheel-drive vehicle where an engine is longitudinally disposed. The shift mechanism 10 is provided in the power transmission path between an internal combustion engine (hereinafter, simply referred to as "engine") 8 such as a gasoline engine or a diesel engine, and a pair of drive wheels 34. The engine 8 is a driving power source for driving the vehicle, which is directly connected to the input shaft 14, or indirectly connected to the input shaft 14 via the pulsation absorption damper (not shown). The shift mechanism 10 transmits power from the engine 8 to the pair of drive wheels 34 via a differential gear unit (final reducer) 32 (refer to FIG. 7), a pair of axles, and the like, which constitute a part of the power transmission path.

Thus, the engine 8 is directly connected to the differential portion 11 in the shift mechanism 10 in the embodiment. That is, the engine 8 is connected to the differential portion 11 without providing a fluid transmission device such as a torque converter or a fluid coupling between the engine 8 and the differential portion 11. For example, when the engine 8 is connected to the differential portion 11 via the above-described pulsation absorption damper, it is regarded that the engine 8 is directly connected to the differential portion 11. Because the configuration of the shift mechanism 10 is symmetric with respect to the axis thereof, the lower portion of the shift mechanism 10 is omitted in the schematic diagram in FIG. 1.

The differential portion 11 includes a first motor M1, a power split mechanism 16, and a second motor M2. The power split mechanism 16 is a mechanical mechanism that mechanically distributes the output from the engine 8, which is input to the input shaft 14. That is, the power split mechanism 16 is a differential mechanism that distributes the output from the engine 8 to the first motor M1 and the transmitting member 18. The second motor M2 is operatively connected to the transmitting member 18 so that the second motor M2 is rotated integrally with the transmitting member 18. Each of the first motor M1 and the second motor M2 in the embodiment is a so-called motor-generator that has the function of generating electric power (power-generation function). The first motor M1 has at least the power-generation function for bearing a reaction force. The second motor M2 has at least a motor function for outputting the driving power as the driving power source. In this specification, the first motor M1 and the second motor M2 may be collectively referred to as "motor M" when the first motor M1 and the second motor M2 are not distinguished from each other.

The power split mechanism 16 mainly includes a first planetary gear unit 24. The first planetary gear unit 24 is of a single pinion type, and has a predetermined gear-ratio ρ1 of, for example, approximately "0.418". The first planetary gear unit 24 includes a first sun gear S1, a first planetary gear P1, a first carrier CA1, and a first ring gear R1, which are rotational elements (elements). The first carrier CA1 supports the first planetary gear P1 so that the first planetary gear P1 rotates on its axis, and moves around the first sun gear S1. The first ring gear R1 engages with the first sun gear S1 via the first planetary gear P1. The gear ratio ρ1 is equal to ZS1/ZR1. In this equation, ZS1 represents the number of teeth of the first sun gear S1, and ZR1 represents the number of teeth of the first ring gear R1.

In the power split mechanism 16, the first carrier CA1 is connected to the input shaft 14, that is, the engine 8. The first sun gear S1 is connected to the first motor M1. The first ring gear R1 is connected to the transmitting member 18. When the three elements of the first planetary gear unit 24, that is, the first sun gear S1, the first carrier CA1, and the first ring gear R1 can be rotated relative to each other, the power split mechanism 16 having the above-described configuration is placed in a differential mode in which the differential action can be performed, that is, the differential action is performed. Thus, the output from the engine 8 is distributed to the first motor M1 and the transmitting member 18. Also, electric energy is generated by the first motor M1 using part of the output from the engine 8 that is distributed to the first motor M1, and the generated electric energy is accumulated, or used to rotate the second motor M2. Thus, the differential portion 11 (the power split mechanism 16) functions as an electric differential device. Accordingly, for example, the differential portion 11 is placed in a so-called continuously-variable transmission (CVT) mode (electric CVT mode). That is, the differential portion 11 continuously changes the rotational speed of the transmitting member 18, regardless of the rotational speed of the engine 8. That is, when the power split mechanism 16 is placed in the differential mode, the differential portion 11 is also placed in the differential mode. Thus, the differential portion 11 functions as the electric CVT in which a speed ratio γ0 (the rotational speed $N_{IN}$ of the input shaft 14/the rotational speed $N_{18}$ of the transmitting member 18) is continuously changed from the minimum value γ0min to the maximum value γ0max.

The automatic shift portion 20 includes a second planetary gear unit 26 of a single pinion type, a third planetary gear unit 28 of a single pinion type, and a fourth planetary gear unit 30 of a single pinion type. The automatic shift portion 20 functions as a stepped automatic transmission. That is, the automatic shift portion 20 is a planetary gear type automatic transmission with a plurality of gears. The second planetary gear unit 26 includes a second sun gear S2, a second planetary gear P2, a second carrier CA2, and a second ring gear R2. The second carrier CA2 supports the second planetary gear P2 such that the second planetary gear P2 rotates on its axis, and moves around the second sun gear S2. The second ring gear R2 engages with the second sun gear S2 via the second planetary gear P2. The second planetary gear unit 26 has a predetermined gear ratio ρ2 of, for example, approximately "0.562". The third planetary gear unit 28 includes a third sun gear S3, a third planetary gear P3, a third carrier CA3, and a third ring gear R3. The third carrier CA3 supports the third planetary gear P3 such that the third planetary gear P3 rotates on its axis, and moves around the third sun gear S3. The third ring gear R3 engages with the third sun gear S3 via the third planetary gear P3. The third planetary gear unit 28 has a predetermined gear ratio ρ3 of, for example, approximately "0.425". The fourth planetary gear unit 30 includes a fourth sun gear S4, a fourth planetary gear P4, a fourth carrier CA4, and a fourth ring gear R4. The fourth carrier CA4 supports the fourth planetary gear P4 such that the fourth planetary gear P4 rotates on its axis, and moves around the fourth sun gear S4. The fourth ring gear R4 engages with the fourth sun gear S4 via the fourth planetary gear P4. The fourth planetary gear unit 30 has a predetermined gear ratio ρ4 of, for example, approximately "0.421". The gear ratio ρ2 is equal to ZS2/ZR2. In this equation, ZS2 represents the number of teeth of the second sun gear S2, and ZR2 represents the number of teeth of the second ring gear R2. The gear ratio ρ3 is equal to ZS3/ZR3. In this equation, ZS3 represents the number of teeth of the third sun gear S3. ZR3 represents the number of teeth of the third ring gear R3. The gear ratio ρ4 is equal to ZS4/ZR4. In this equation, ZS4 represents the number of teeth of the fourth sun gear S4. ZR4 represents the number of teeth of the fourth ring gear R4.

In the automatic shift portion 20, the second sun gear S2 and the third sun gear S3, which are integrally connected to each other, are selectively connected to the transmitting member 18 via the second clutch C2. Also, the second sun gear S2 and the third sun gear S3 are selectively connected to the case 12 via the first brake B1. The second carrier CA2 is selectively connected to the case 12 via the second brake B2. The fourth ring gear R4 is selectively connected to the case 12 via the third brake B3. The second ring gear R2, the third carrier CA3, and the fourth carrier CA4, which are integrally connected to each other, are connected to the output shaft 22. The third ring gear R3 and the fourth sun gear S4, which are integrally connected to each other, are selectively connected to the transmitting member 18 via the first clutch C1.

Thus, the automatic shift portion 20 is selectively connected to the differential portion 11 (the transmitting member 18) via the first clutch C1 or the second clutch C2 that is used to select each gear of the automatic shift portion 20. In other words, each of the first clutch C1 and the second clutch C2 functions as an engagement device that selectively switches the state of the power transmission path between the transmitting member 18 and the automatic shift portion 20, that is, the power transmission path from the differential portion 11 (the transmitting member 18) to the drive wheels 34. The state of the power transmission path is selectively switched between a power-transmission permitted state and a power-transmission interrupted state. When the power transmission path is in the power-transmission permitted state, the transmission of power is permitted. When the power transmission path is in the power-transmission interrupted state, the transmission of power is interrupted. That is, when at least one of the first clutch C1 and the second clutch C2 is engaged, the power transmission path is placed in the power-transmission permitted state. When the first clutch C1 and the second clutch C2 are disengaged, the power transmission path is placed in the power-transmission interrupted state.

When a hydraulic frictional engagement device that needs to be disengaged (hereinafter, referred to as "disengagement-side engagement device") is disengaged, and a hydraulic frictional engagement device that needs to be engaged (hereinafter, referred to as "engagement-side engagement device") is engaged in the automatic shift portion 20, a clutch-to-clutch shift is performed. As a result, one of the first gear to the fourth gear, or the reverse gear, or the neutral state is selected. Thus, the speed ratio γ (=the rotational speed $N_{18}$ of the transmitting member 18/the output-shaft rotational speed $N_{OUT}$ of the output shaft 22) at each gear is achieved. The speed ratio γ changes substantially geometrically. As shown in an engagement operation table in FIG. 2, for example, when the shift mechanism 10 functions as the stepped transmission, the first gear, at which a speed ratio γ1 is set to the maximum value, for example, approximately "3.357", is selected by engaging the first clutch C1 and the third brake B3. The second gear, at which a speed ratio γ2 is set to a value smaller than the speed ratio γ1, for example, approximately "2.180", is selected by engaging the first clutch C1 and the second brake B2. The third gear, at which a speed ratio γ3 is set to a value smaller than the speed ratio γ2, for example, approximately "1.424", is selected by engaging the first clutch C1 and the first brake B1. The fourth gear, at which a speed ratio γ4 is set to a value smaller than the speed ratio γ3, for example, approximately "1.000", is selected by engaging the first clutch C1 and the second clutch C2. As shown in FIG. 2, the fifth gear is selected by engaging both of the first clutch C1 and the second clutch C2. The "reverse gear", at which a speed ratio γR is set to a value between the speed ratios γ1 and γ2, for example, approximately "3.209", is selected by engaging the second clutch C2 and the third brake B3. The neutral state "N" is selected by disengaging the first clutch C1, the second clutch C2, the first brake B1, the second brake B2, and the third brake B3.

The first clutch C1, the second clutch C2, the first brake B1, the second brake B2, and the third brake B3 (hereinafter, collectively referred to as "clutches C" and "brakes B" unless a specific clutch or a specific brake needs to be distinguished from the other clutches or the other brakes) are hydraulic frictional engagement devices that are generally used in conventional automatic transmissions. Each of the clutches C and the brakes B may be a wet multiple disc type clutch and brake in which a plurality of stacked frictional plates are pressed by a hydraulic actuator. Each of the brakes B may be a band brake in which one or two bands is (are) wound around the outer peripheral surface of a drum that is rotated, and the end(s) of the one or two bands is (are) tightened by a hydraulic actuator. Each of the clutches C and the brakes B selectively connects members that are provided on both sides thereof.

In the shift mechanism 10 that has the above-described configuration, the CVT is formed by combining the differential portion 11 that functions as the CVT with the automatic shift portion 20. When the speed ratio of the differential portion 11 is controlled to be constant, the stepped transmission is substantially formed by combining the differential portion 11 with the automatic shift portion 20.

More specifically, when the differential portion 11 functions as the CVT, and the automatic shift portion 20, which is connected to the differential portion 11 in series, functions as the stepped transmission, the rotational speed input to the automatic shift portion 20 (hereinafter, referred to as "input rotational speed for the automatic shift portion 20") at least one gear M of the automatic shift portion 20, that is, the rotational speed of the transmitting member 18 (hereinafter, referred to as "transmitting-member rotational speed $N_{18}$") is continuously changed. As a result, the speed ratio is continuously changed in a certain range at the at least one gear M. Accordingly, the total speed ratio γT of the shift mechanism 10 (=the rotational speed $N_{IN}$ of the input shaft 14/the rotational speed $N_{OUT}$ of the output shaft 22) is continuously changed. Thus, the CVT is formed in the shift mechanism 10. The total speed ratio γT of the shift mechanism 10 is determined based on the speed ratio γ0 of the differential portion 11 and the speed ratio γ of the automatic shift portion 20.

For example, the transmitting-member rotational speed Nag is continuously changed at each of the first gear to the fourth gear, and the reverse gear of the automatic shift portion 20 shown in the engagement operation table in FIG. 2. Thus, the speed ratio is continuously changed in a certain range at each of the first gear to the fourth gear, and the reverse gear. As a result, the speed ratio is continuously changed between the first gear and the second gear, between the second gear and the third gear, and between the third gear and the fourth gear. Accordingly, the total speed ratio γT of the entire shift mechanism 10 is continuously changed. The ratio of the speed ratio at a gear to a speed ratio at an adjacent higher gear (i.e., step) is shown in the section "STEP" in FIG. 2. As shown in the section "TOTAL" in FIG. 2, the ratio of the speed ratio at first gear to the speed ratio at the fourth gear is 3.36.

When the speed ratio of the differential portion 11 is controlled to be constant, and the clutches C and the brakes B are selectively engaged to select any one of the first gear to the fourth gear, and the reverse gear, the total speed ratio γT of the entire shift mechanism 10 at each gear is achieved. The total speed ratio γT changes substantially geometrically. Accordingly, in the shift mechanism 10, the stepped transmission is substantially formed.

For example, when the speed ratio γ0 of the differential portion 11 is controlled to be fixed to "1", the total speed ratio γT of the shift mechanism 10 at each of the first gear to the fourth gear, and the reverse gear of the automatic shift portion 20 is achieved, as shown in the engagement operation table in FIG. 2. When the speed ratio γ0 of the differential portion 11 is fixed to a value smaller than "1", for example, approximately 0.7, at the fourth gear of the automatic shift portion 20, the total speed ratio γT is set to a value smaller than "1" at the fourth gear, for example, approximately "0.7".

Figure 3:
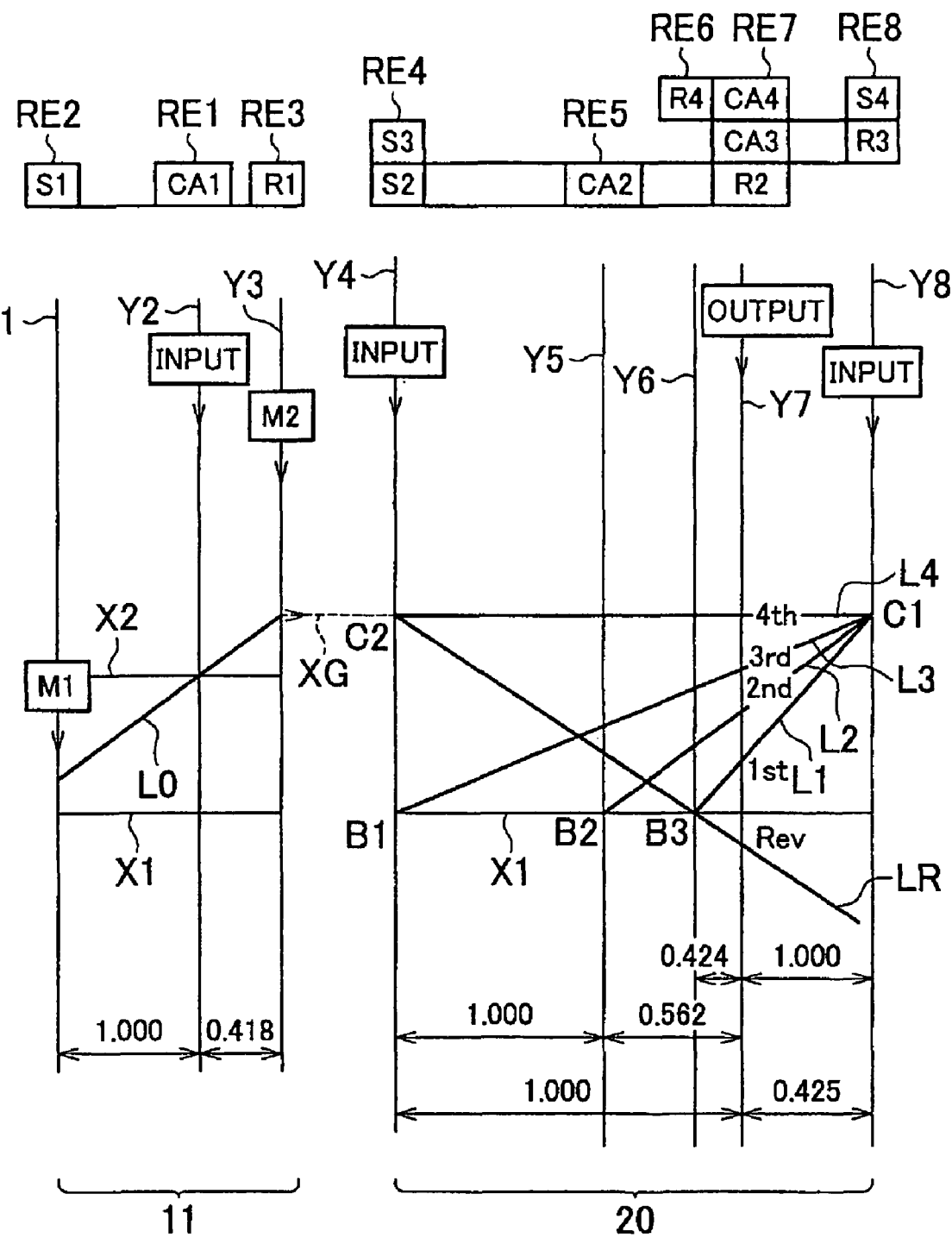
FIG. 3 is a collinear diagram explaining the relative rotational speeds at each gear in the drive apparatus in FIG. 1.

FIG. 3 is a collinear diagram in which straight lines indicate the relative relation among the rotational speeds of the rotational elements in the shift mechanism 10 that includes the differential portion 11 and the automatic shift portion 20. Each of the rotational elements is in a connected state or disconnected state at each gear. The collinear diagram in FIG. 3 is a two-dimensional coordinate. In the collinear diagram in FIG. 3, the horizontal axis indicates the relation among the gear ratios ρ (ρ1, ρ2, ρ3, and ρ4) of the planetary gear units 24, 26, 28, and 30, and the vertical axis indicates relative rotational speeds. The horizontal line X1 among the three horizontal lines indicates the rotational speed of "0". The horizontal line X2 indicates the rotational speed of "1.0", that is, a rotational speed $N_E$ of the engine 8 connected to the input shaft 14. The horizontal line XG indicates the rotational speed of the transmitting member 18.

The three vertical lines Y1, Y2, and Y3 indicate the relative rotational speeds of the three rotational elements of the power split mechanism 16 that constitutes the differential portion 11. That is, the vertical line Y1 indicates the relative rotational speed of the first sun gear S1 that is regarded as a second rotational element (second element) RE2. The vertical line Y2 indicates the relative rotational speed of the first carrier CA1 that is regarded as a first rotational element (first element) RE1. The vertical line Y3 indicates the relative rotational speed of the first ring gear R1 that is regarded as a third rotational element (third element) RE3. The intervals between the vertical lines Y1 and Y2, and between the vertical lines Y2 and Y3 are set based on the gear ratio ρ1 of the first planetary gear unit 24. Further, the five vertical lines Y4, Y5, Y6, Y7, and Y8 indicate the relative rotational speeds of the rotational elements of the automatic shift portion 20. That is, the vertical line Y4 indicates the relative rotational speed of the second sun gear S2 and the third sun gear S3, which are connected to each other, and which are regarded as a fourth rotational element (fourth element) RE4. The vertical line Y5 indicates the relative rotational speed of the second carrier CA2 that is regarded as a fifth rotational element (fifth element) RE5. The vertical line Y6 indicates the relative rotational speed of the fourth ring gear R4 that is regarded as a sixth rotational element (sixth element) RE6. The vertical line Y7 indicates the relative rotational speed of the second ring gear R2, the third carrier CA3, and the fourth carrier CA4, which are connected to each other, and which are regarded as a seventh rotational element (seventh element) RE7. The vertical line Y8 indicates the relative rotational speed of the third ring gear R3 and the fourth sun gear S4, which are connected to each other, and which are regarded as an eighth rotational element (eighth element) RE8. The intervals between the vertical lines are set based on the gear ratios ρ2 of the second planetary gear unit 26, the gear ratio ρ3 of the third planetary gear unit 28, and the gear ratio ρ4 of the fourth planetary gear unit 30. In the collinear diagram, the interval between the sun gear and the carrier is set to indicate "1". The interval between the carrier and the ring gear is set to indicate the gear ratio ρ (ρ1, ρ2, ρ3, or ρ4). That is, in the differential portion 11, the interval between the vertical lines Y1 and Y2 is set to indicate "1", and the interval between the vertical lines Y2 and Y3 is set to indicate the gear ratio ρ1. In the automatic shift portion 20, the interval between the sun gear and the carrier in each of the second planetary gear unit 26, the third planetary gear unit 28, and the fourth planetary gear unit 30 is set to indicate "1". The interval between the carrier and the ring gear in each of the second planetary gear unit 26, the third planetary gear unit 28, and the fourth planetary gear unit 30 is set to indicate the gear ratio ρ (ρ2, ρ3, or ρ4).

As shown in the collinear diagram in FIG. 3, in the power splint mechanism 16 (the differential portion 11) in the shift mechanism 10 in the embodiment, the first rotational element RE1 (the first carrier CA1) is connected to the input shaft 14, that is, the engine 8, and the second rotational element RE2 is connected to the first motor M1, and the third rotational element (the first ring gear R1) RE3 is connected to the transmitting member 18 and the second motor M2. Thus, the rotation of the input shaft 14 is transmitted (input) to the automatic shift portion 20 via the transmitting member 18. In this case, the oblique straight line L0 that passes through the intersection of the lines Y2 and X2 indicates the relation between the rotational speed of the first sun gear S1 and the rotational speed of the first ring gear R1.

For example, the differential portion 11 may be placed in the differential mode so that the first rotational element RE1 to the third rotational element RE3 can be rotated relative to each other, and the rotational speed of the first ring gear R1, which depends on the vehicle speed V, may be substantially constant. In this case, when the rotational speed of the first sun gear S1 is increased or decreased by controlling the rotational speed of the first motor M1, the rotational speed of the first carrier CA1, that is, the engine speed $N_E$ is increased or decreased. The rotational speed of the first ring gear R1 is indicated by the intersection of the straight line L0 and the vertical line Y3, and depends on a vehicle speed V. The rotational speed of the first sun gear S1 is indicated by the intersection of the straight line L0 and the vertical line Y1. The rotational speed of the first carrier CA1 is indicated by the intersection of the straight line L0 and the vertical line Y2.

When the rotational speed of the first sun gear S1 is made equal to the rotational speed of the engine speed $N_E$ by controlling the rotational speed of the first motor M1 so that the speed ratio γ0 of the differential portion 11 is fixed to "1", the straight line L0 matches the horizontal line X2. Thus, the transmitting member 18 is rotated such that the rotational speed of the first ring gear R1 is equal to the engine speed $N_E$. When the rotational speed of the first sun gear S1 is made 0 by controlling the rotational speed of the first motor M1 so that the speed ratio γ0 of the differential portion 11 is fixed to a value smaller than "1", for example, approximately 0.7, the transmitting member 18 is rotated at the transmitting-member rotational speed $N_{18}$, which is higher than the engine speed $N_E$.

In the automatic shift portion 20, the fourth rotational element RE4 is selectively connected to the transmitting member 18 via the second clutch C2, and selectively connected to the case 12 via the first brake B1. The fifth rotational element RE5 is selectively connected to the case 12 via the second brake B2. The sixth rotational element RE6 is selectively connected to the case 12 via the third brake B3. The seventh rotational element RE7 is connected to the output shaft 22. The eighth rotational element RE8 is selectively connected to the transmitting member 18 via the first clutch C1.

When the straight line L0 matches the horizontal line X2 in the differential portion 11, and the rotational speed that is equal to the engine speed $N_E$ is input to the eighth rotational element RE8 from the differential portion 11, the rotational speed of the output shaft 22 at the first gear is indicated by the intersection of the oblique straight line L1 and the vertical line Y7 in the automatic shift portion 20, as shown in FIG. 3. The straight line L1 is set by engaging the first clutch C1 and the third brake B3. The straight line L1 passes through the intersection of the vertical line Y8 that indicates the rotational speed of the eighth rotational element RE8 and the horizontal line X2, and the intersection of the vertical line Y6 that indicates the rotational speed of the sixth rotational element RE6 and the horizontal line X1. The vertical line Y7 indicates the rotational speed of the seventh rotational element RE7 connected to the output shaft 22. Similarly, the rotational speed of the output shaft 22 at the second gear is indicated by the intersection of the oblique straight line L2 and the vertical line Y7. The straight line L2 is set by engaging the first clutch C1 and the second brake B2. The rotational speed of the output shaft 22 at the third gear is indicated by the intersection of the oblique straight line L3 and the vertical line Y7. The straight line L3 is set by engaging the first clutch C1 and the first brake B1. The rotational speed of the output shaft 22 at the fourth gear is indicated by the intersection of the horizontal straight line LA and the vertical line Y7. The straight line L4 is set by engaging the first clutch C1 and the second clutch C2.

Figure 4:
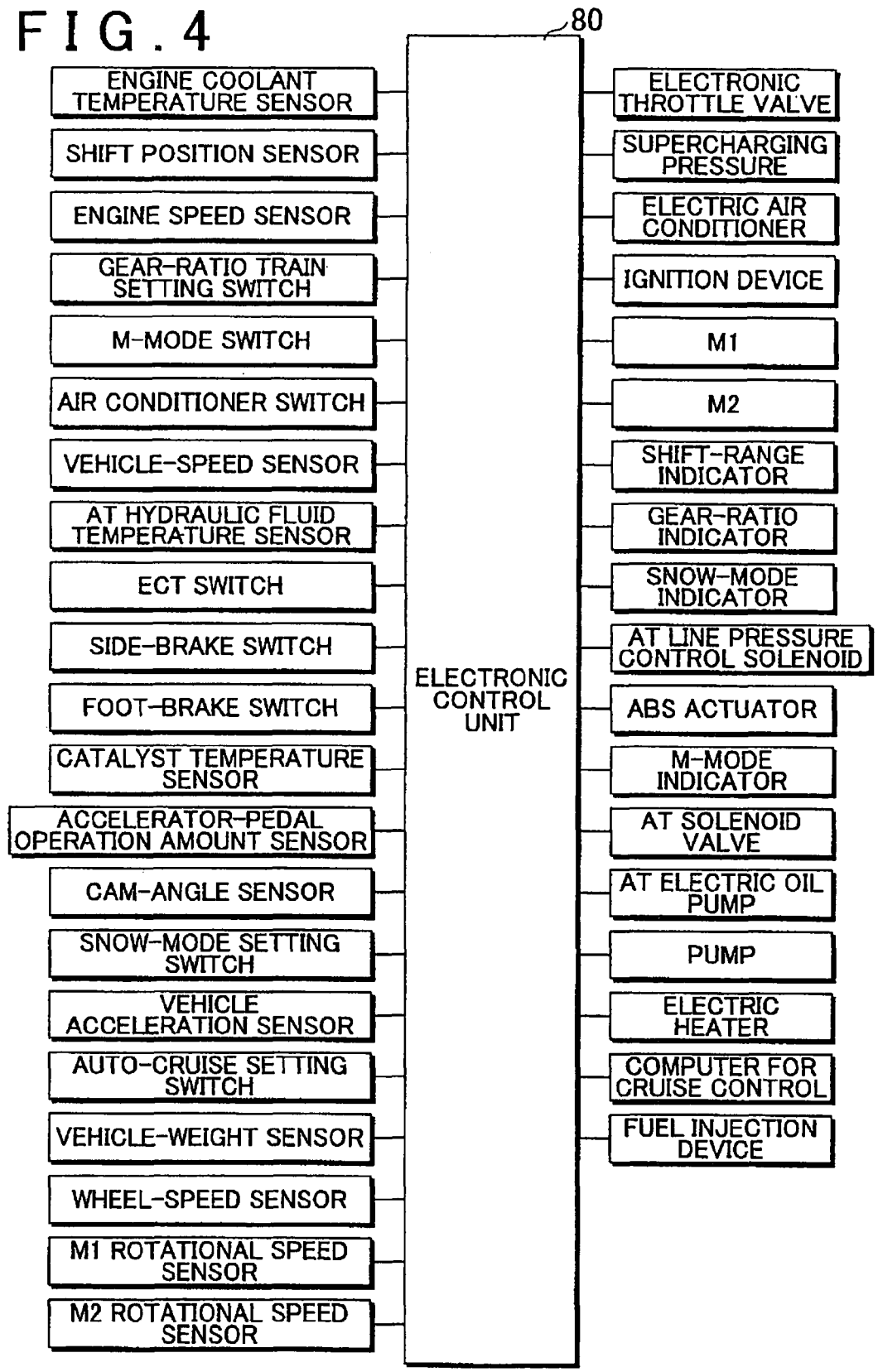
FIG. 4 is a diagram explaining signals input to and output from an electronic control unit provided in the drive apparatus in FIG. 1.

FIG. 4 shows signals that are input to an electronic control unit 80, and signals that are output from the electronic control unit 80 to control the shift mechanism 10 in the embodiment. The electronic control unit 80 includes a so-called microcomputer that includes a CPU, ROM, RAM, and an input/output interface. The electronic control unit 80 executes a hybrid drive control relating to the engine 8, and the first and second motors M1 and M2, and a drive control including a shift control for the automatic shift portion 20, by processing the signals according to programs that are prestored in the ROM, using the temporary storage function of the RAM.

The electronic control unit 80 receives the signals from sensors and switches shown in FIG. 4. That is, the electronic control unit 80 receives a signal indicating an engine coolant temperature $T_{EMPW}$, a signal indicating a shift position $P_{SH}$ at which a shift lever 52 (refer to FIG. 6) is placed, a signal indicating the number of times that the shift lever 52 is operated at the position "M", a signal indicating the engine speed $N_E$ that is the rotational speed of the engine 8, a signal indicating a gear-ratio train set value, a signal providing an instruction for a manual mode (M-mode), a signal indicating the operation of an air conditioner, a signal indicating the vehicle speed V which depends on the rotational speed $N_{OUT}$ of the output shaft 22, a signal indicating the temperature $T_{OIL}$ of hydraulic oil in the automatic shift portion 20, a signal indicating the setting of a power mode (output from an ECT switch), a signal indicating the operation of an emergency brake, a signal indicating the operation of a foot brake, a signal indicating a catalyst temperature, a signal indicating the operation amount of an accelerator pedal (i.e., an accelerator-pedal operation amount Acc) which depends on the amount of output required by a driver, a signal indicating a cam angle, a signal indicating the setting of a snow mode, a signal indicating longitudinal acceleration G, a signal indicating an auto-cruise mode, a signal indicating the weight of the vehicle, a signal indicating the wheel speed of each wheel, a signal indicating the rotational speed $N_{M1}$ of the first motor M1 (hereinafter, referred to as "first-motor rotational speed $N_{M1}$"), a signal indicating the rotational speed $N_{M2}$ of the second motor M2 (hereinafter, referred to as "second-motor rotational speed $N_{M2}$", a signal indicating the state of charge SOC in an electric power storage device 56 (refer to FIG. 7), and the like.

The electronic control unit 80 outputs control signals to an engine output control device 58 (refer to FIG. 7) that controls the output from the engine 8. For example, the electronic control unit 80 outputs a drive signal to a throttle actuator 64 to control the throttle-valve opening amount $\theta_{TH}$ of an electronic throttle valve 62 provided in the intake pipe 60 of the engine 8, a fuel-supply amount signal that controls the amount of fuel supplied by a fuel injection device 66 to the intake pipe 60 or the cylinder of the engine 8, and an ignition signal that provides an instruction for the timing at which an ignition device 68 ignites the fuel in the engine 8. The electronic control unit 80 also outputs a supercharging-pressure adjustment signal that adjusts supercharging pressure, an electric air-conditioner drive signal that operates the electric air conditioner, an instruction signal that provides an instruction for the operation of the motors M1 and M2, a shift position (operational position) indication signal that operates a shift indicator, a gear-ratio indication signal that causes a gear-ratio indicator to indicate the gear ratio, a snow-mode indication signal that causes a snow-mode indicator to indicate that the snow mode is selected, an ABS operation signal that operates an ABS (anti-locking braking system) actuator that prevents the slip of the wheels at the time of braking, a M-mode indication signal that causes a M-mode indicator to indicate that the M-mode is selected, a valve-instruction signal that operates electromagnetic valves (linear solenoid valves) in a hydraulic control circuit 70 (refer to FIG. 5 and FIG. 7) to control hydraulic actuators for the hydraulic frictional engagement devices in the differential portion 11 and the automatic shift portion 20, a drive instruction signal that operates an electric hydraulic pump for supplying a hydraulic pressure that is used as a basic pressure when a line pressure $P_L$ is regulated using a regulator valve provided in the hydraulic control circuit 70, a signal that drives an electric heater, a signal for a computer used for the cruise control, and the like.

Figure 5:
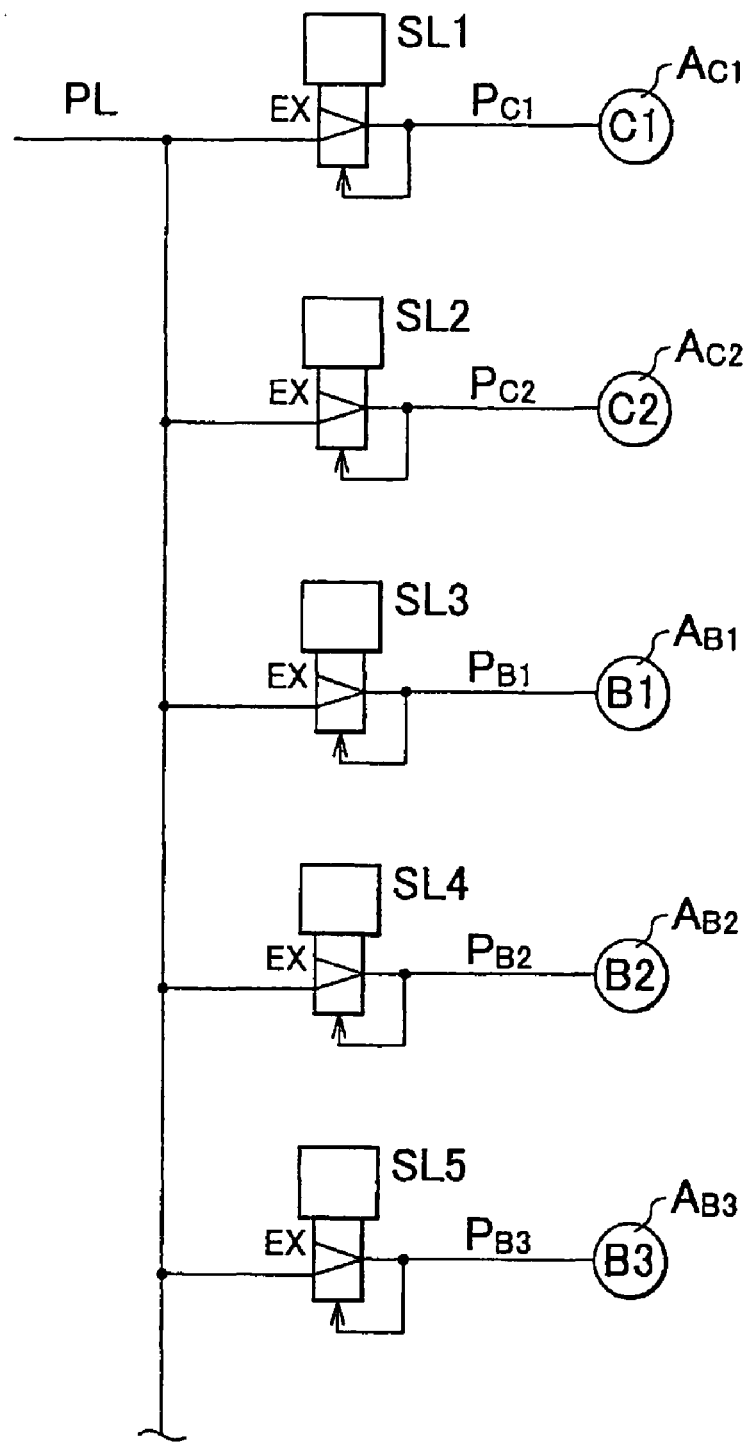
FIG. 5 is a circuit diagram relating to linear solenoid valves that control hydraulic actuators for clutches C and brakes B, in a hydraulic control circuit.

FIG. 5 is a circuit diagram relating to linear solenoid valves SL1 to SL5 in the hydraulic control circuit 70. The linear solenoid valves SL1 to SL5 controls the operations of hydraulic actuators (hydraulic cylinders) $A_{C1}$, $A_{C2}$, $A_{B1}$, $A_{B2}$, and $A_{B3}$ for the clutches C1 and C2, and the brakes B1 to B3, respectively.

In FIG. 5, according to instruction signals from the electronic control unit 80, the linear solenoid valves SL1 to SL5 regulate engagement pressures $P_{C1}$, $P_{C2}$, $P_{B1}$, $P_{B2}$, and $P_{B3}$, respectively, using a line pressure PL. Then, the engagement pressures $P_{C1}$, $P_{C2}$, $P_{B1}$, $P_{B2}$, and $P_{B3}$ are directly supplied to the actuators $A_{C1}$, $A_{C2}$, $A_{B1}$, $A_{B2}$, and $A_{B3}$, respectively. For example, a relief regulator valve regulates the line pressure PL to a value according to an engine load or the like represented by the accelerator-pedal operation amount or a throttle-valve opening amount, using a hydraulic pressure generated by a mechanical oil pump rotated by an electric oil pump (not shown) or the engine 8, as a basic pressure.

The linear solenoid valves SL1 to SL5 basically have the same configuration. The electronic control unit 80 energizes/de-energizes the linear solenoid valves SL1 to SL5, independently. Thus, the hydraulic pressures for the hydraulic actuators $A_{C1}, A_{C2}, A_{B1}, A_{B2}$, and $A_{B3}$ are regulated independently. Accordingly, the engagement pressures $P_{C1}, P_{C2}, P_{B1}, P_{B2}$, and $P_{B3}$ for the clutches C1 to C4, and the brakes B1 and B2 are controlled independently. In the automatic shift portion 20, each gear is selected by engaging predetermined engagement devices, for example, as shown in the engagement operation table in FIG. 2. In the shift control for the automatic shift portion 20, for example, engagement and disengagement of the clutch C and the brake B relating to the shift are simultaneously controlled, that is, the so-called clutch-to-clutch shift is performed.

Figure 6:
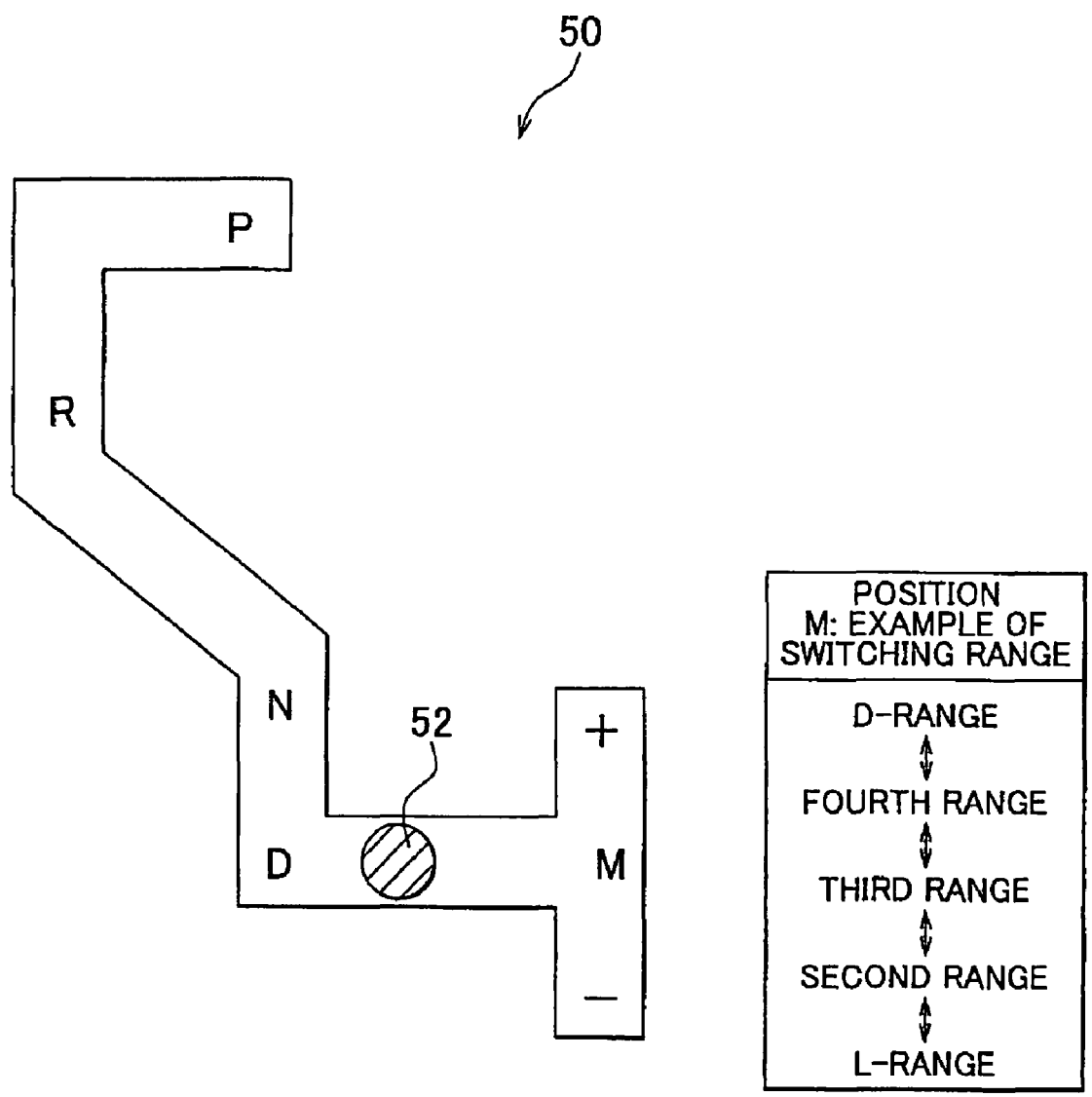
FIG. 6 shows an example of a shift operation device that includes a shift lever, and that is operated to select a shift position among a plurality of positions.

FIG. 6 is an example of a diagram showing a shift operation device 50. The shift operation device 50 is a switching device that switches the shift position $P_{SH}$ among a plurality of positions according to the operation performed by the driver. The shift operation device 50 is provided, for example, on the side of a driver's seat. The shift operation device 50 includes the shift lever 52 that is operated to select the shift position $P_{SH}$ among the plurality of positions.

The shift lever 52 is manually moved to one of a parking position "P (Parking)", a reverse position "R (Reverse)", a neutral position "N (Neutral)", an automatic-shift forward-running position "D (Drive)", and a manual-shift forward-running position "M (Manual)". When the shift lever 52 is at the position "P (Parking)", the transmission of power is interrupted in the power transmission path in the shift mechanism 10, that is, in the automatic shift portion 20 so that the shift mechanism 10 is in the neutral state, and the output shaft of the automatic shift portion 20 is locked. When the shift lever 52 is at the position "R (Reverse)", the vehicle backs up. When the shift lever 52 is at the position "N (Neutral)", the transmission of power is interrupted in the power transmission path in the shift mechanism 10 so that the shift mechanism 10 is placed in the neutral state. When the shift lever 52 is at the position "D (Drive)", an automatic shift control is executed to select the total speed ratio $\gamma T$ of the shift mechanism 10 in a range in which the total speed ratio $\gamma T$ can be changed. The total speed ratio $\gamma T$ is determined based on the speed ratio of the differential portion 11 and the speed ratio of the automatic shift portion 20 at each gear. The speed ratio of the differential portion 11 is continuously changed in a certain range. The gear of the automatic shift portion 20 is selected among the first gear to the fourth gear by the automatic shift control. When the shift lever 52 is at the position "M (Manual)" a manual shift mode (manual mode) is selected to set so-called shift ranges by restricting the use of the high gear(s) of the automatic shift portion 20 that is (are) used in the automatic shift control.

When the shift lever 52 is manually moved to the shift position $P_{SH}$ among the above-described positions, for example, the state of the hydraulic control circuit 70 is electrically switched to select one of the reverse gear "R", the neutral state "N", the gears in the forward gear "D", and the like shown in the engagement operation table in FIG. 2.

Among the positions "P" to "M", each of the positions "P" and "N" is a non-running position that is selected to stop the vehicle from running. When the shift lever 52 is at the position "P" or "N", for example, both of the first clutch C1 and the second clutch C2 are disengaged, as shown in the engagement operation table in FIG. 2. That is, each of the positions "P" and "N" is a non-drive position for switching the state of the power transmission path in the automatic shift portion 20 to the power-transmission interrupted state by disengaging the first clutch C1 and the second clutch C2 so that the transmission of the power is interrupted in the power transmission path and the vehicle cannot be driven. Each of the positions "R", "D", and "M" is a running position that is selected to cause the vehicle to run. When the shift lever 52 is at the position "R", "D", or "M", for example, at least one of the first clutch C1 and the second clutch C2 is engaged as shown in the engagement operation table in FIG. 2. That is, each of the positions "R", "D", and "M" is a drive position for switching the state of the power transmission path in the automatic shift portion 20 to the power-transmission permitted state by engaging the first clutch C1 and/or the second clutch C2 so that the transmission of power is permitted in the power transmission path and the vehicle can be driven.

More specifically, when the shift lever 52 is manually moved from the position "P" or "N" to the position "R", the state of the power transmission path in the automatic shift portion 20 is switched from the power-transmission interrupted state to the power-transmission permitted state by engaging the second clutch C2. When the shift lever 52 is manually moved from the position "N" to the position "D", the state of the power transmission path in the automatic shift portion 20 is switched from the power-transmission interrupted state to the power-transmission permitted state by engaging at least the first clutch C1. When the shift lever 52 is manually moved from the position "R" to the position "P" or "N", the state of the power transmission path in the automatic shift portion 20 is switched from the power-transmission permitted state to the power-transmission interrupted state by disengaging the second clutch C2. When the shift lever 52 is manually moved from the position "D" to the position "N", the state of the power transmission path in the automatic shift portion 20 is switched from the power-transmission permitted state to the power-transmission interrupted state by disengaging the first clutch C1 and the second clutch C2.

Figure 7:
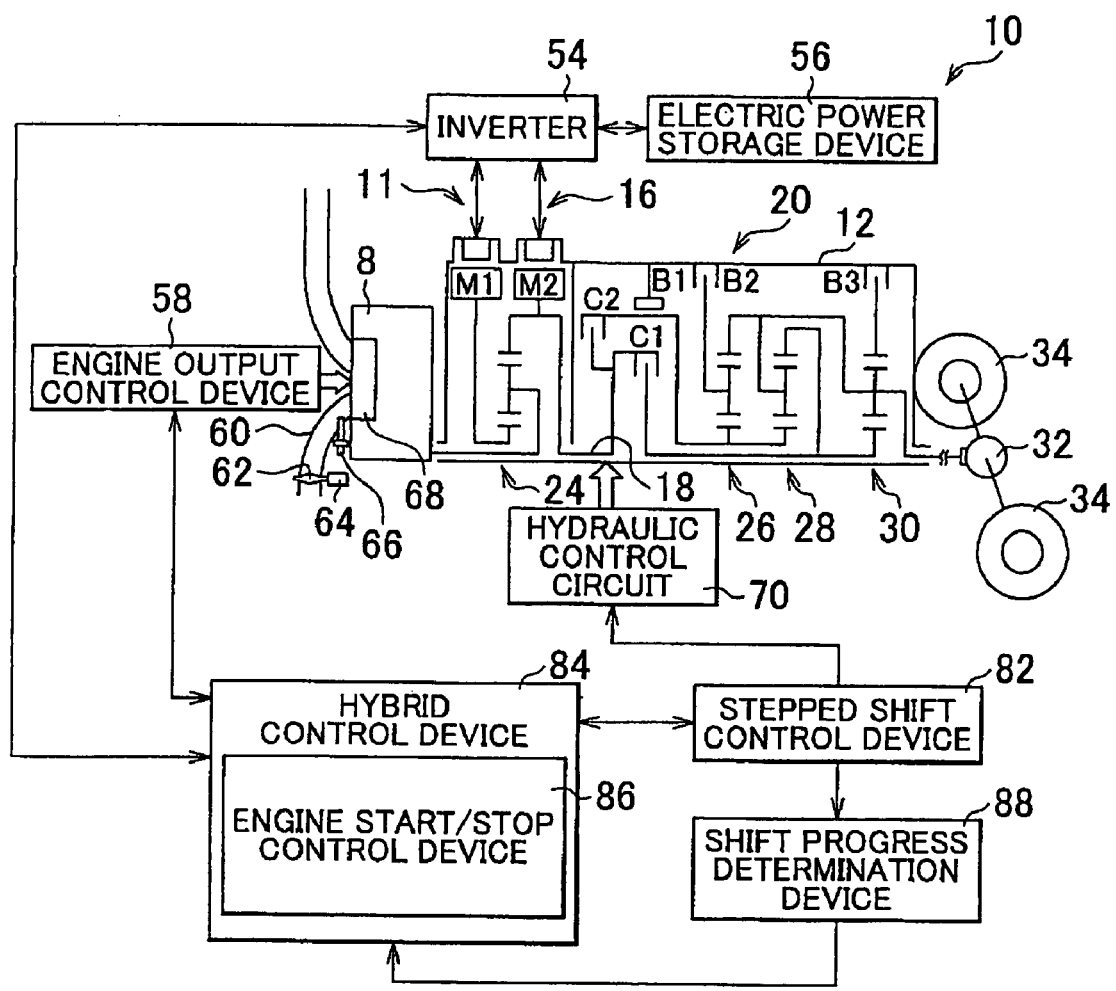
FIG. 7 is a function block diagram explaining the main part of a control operation performed by the electronic control unit in FIG. 4.
Figure 8:
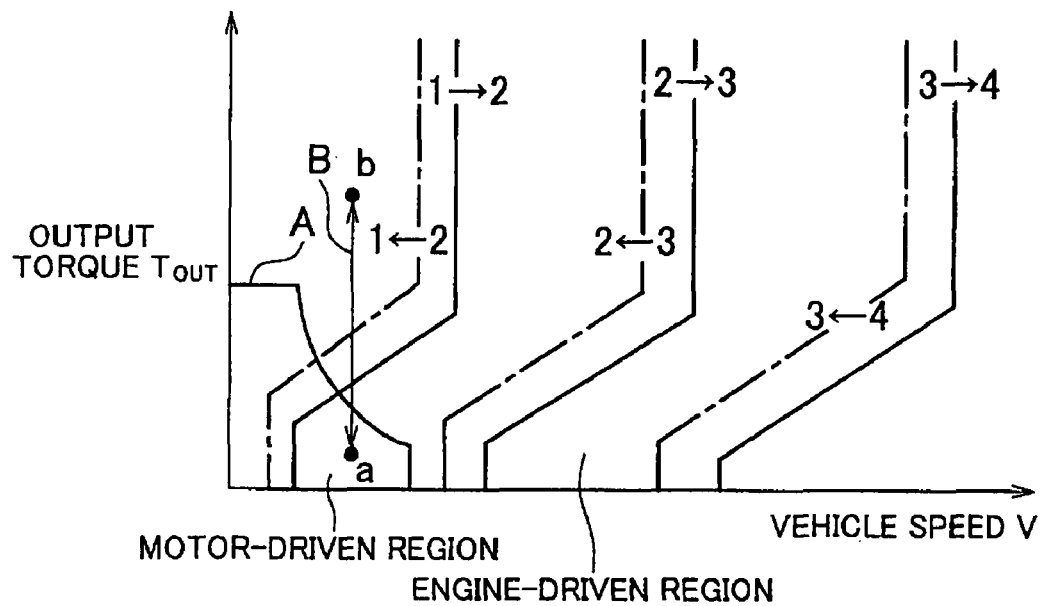
FIG. 8 shows an example of a shift map used in a shift control for the drive apparatus, and an example of a driving power source switching map used in a driving power source switching control that switches a drive mode between an engine-driven mode and a motor-driven mode, and FIG. 8 also shows the relation between the shift map and the driving power source switching map.

FIG. 7 is a function block diagram explaining the main part of the control operation performed by the electronic control unit 80. In FIG. 7, a stepped shift control device 82 determines whether the automatic shift portion 20 should shift, based on the vehicle condition indicated by the actual vehicle speed V and a required torque $T_{OUT}$ output from the automatic shift portion 20, using a prestored shift diagram (i.e., a shift relation, or a shift map) in which the vehicle speed V and the output torque $T_{OUT}$ are used as parameters, and upshift lines (solid lines) and downshift lines (chain lines) are provided, as shown in FIG. 8. That is, the stepped shift control device 82 determines the gear to which the automatic shift portion 20 should shift, based on the vehicle condition, using the shift diagram. Then, the stepped shift control device 82 executes an automatic shift control so that the automatic shift portion 20 shifts to the determined gear.

At this time, the stepped shift control device 82 provides the instruction (i.e., an instruction for output for shift, or a hydraulic pressure instruction) to the hydraulic control circuit 70 to engage and/or disengage the hydraulic frictional engagement devices relating to the shift of the automatic shift portion 20 so that the automatic shift portion 20 shifts to the determined gear according to, for example, the engagement operation table shown in FIG. 2. That is, the stepped shift control device 82 outputs the instruction to the hydraulic control circuit 70 to disengage the disengagement-side engagement device relating to the shift of the automatic shift portion 20, and to engage the engagement-side engagement device relating to the shift of the automatic shift portion 20, thereby performing the clutch-to-clutch shift. According to the instruction, for example, the hydraulic control circuit 70 operates the hydraulic actuators for the hydraulic frictional engagement devices relating to the shift by operating the linear solenoid valves SL in the hydraulic control circuit 70. Thus, the disengagement-side engagement device relating to the shift is disengaged, and the engagement-side engagement device relating to the shift is engaged so that the automatic shift portion 20 shifts to the determined gear.

A hybrid control device 84 operates the engine 8 efficiently, and controls the speed ratio γ0 of the differential portion 11 that functions as the electric CVT, by optimizing the ratio between the driving power provided by the engine 8 and the driving power provided by the second motor M2, and optimizing the reaction force borne by the first motor M1 while the first motor M1 generates electric power. For example, the hybrid control device 84 calculates a target (required) output for driving the vehicle based on the accelerator-pedal operation amount Acc, which indicates the amount of output required by the driver, and the vehicle speed V; calculates a total target output based on the target output for driving the vehicle and a required output for charging the electric power storage device 56; calculates a target engine output so that the total target output can be obtained, talking into account a transfer loss, loads of auxiliary machines, an assist torque provided by the second motor M2, and the like; and controls the engine speed $N_E$ and the engine torque $T_E$ of the engine 8 to obtain the engine output that matches the target engine output, and controls the amount of electric power generated by the first motor M1.

Figure 9:
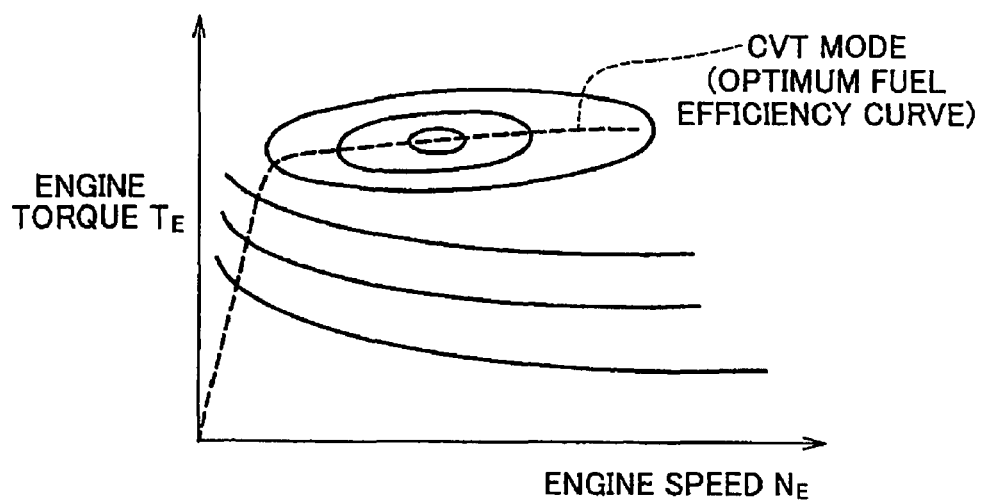
FIG. 9 shows an example of a fuel efficiency map in which a dash line is an optimum fuel efficiency curve.

The hybrid control device 84 executes the hybrid control to improve the power performance, and the fuel efficiency, taking into account the gear of the automatic shift portion 20. During this hybrid control, the differential portion 11 functions as the electric CVT to coordinate the engine speed $N_E$ and the vehicle speed V, which are set to operate the engine 8 efficiently, and the rotational speed of the transmitting member 18, which is set by the gear of the automatic shift portion 20. That is, the hybrid control device 84 sets the target value of the total speed ratio γT of the shift mechanism 10 so that the engine 8 operates according to an optimum fuel efficiency curve (i.e., a fuel efficiency map, a relational diagram) as indicated by the dash line in FIG. 9. The optimum fuel efficiency curve is empirically obtained in advance in a two-dimension coordinate constituted by the engine speed $N_E$ and the torque $T_E$ output from the engine 8 (i.e., engine torque $T_E$) so that high driveability and high fuel efficiency are achieved when the vehicle is driven in the CVT mode. The optimum fuel efficiency curve is stored. For example, the hybrid control device 84 sets the target value of the total speed ratio γT of the shift mechanism 10 to control the engine torque $T_E$ and the engine speed $N_E$ to obtain the engine output that matches the target output (i.e., the total target output, or the required driving power). Then, the hybrid control device 84 controls the speed ratio γ0 of the differential portion 11, taking into the account the gear of the automatic shift portion 20, thereby controlling the total speed ratio γT in a range in which the total speed ratio γT can be changed.

At this time, the hybrid control device 84 supplies the electric energy generated by the first motor M1 to the electric power storage device 56 and the second motor M2 through an inverter 54. Therefore, although a large part of the power output from the engine 8 is mechanically transmitted to the transmitting member 18, part of the power output from the engine 8 is consumed by the first motor M1 to generate electric power. That is, part of the power output from the engine 8 is converted to electric energy in the first motor M1. The electric energy is supplied to the second motor M2 through the inverter 54, and the second motor M2 is driven. Thus, mechanical energy is transmitted from the second motor M2 to the transmitting member 18. The devices related to the process from the generation of the electric power to the consumption of the electric power in the second motor M2 constitute an electric path in which part of the power output from the engine 8 is converted to the electric energy, and the electric energy is converted to the mechanical energy.

The hybrid control device 84 can maintain the engine speed $N_E$ at a substantially constant value, or control the engine speed $N_E$ to any given value by using the electric CVT function of the differential portion 11, for example, to control the first-motor rotational speed $N_{M1}$ and/or the second-motor rotational speed $N_{M2}$, regardless of whether the vehicle is stopped or driven. In other words, the hybrid control device 84 can control the first-motor rotational speed $N_{M1}$ and/or the second-motor rotational speed $N_{M2}$ to any given value(s), while maintaining the engine speed $N_E$ at a substantially constant value, or controlling the engine speed $N_E$ to any given value.

For example, as shown in the collinear diagram in FIG. 3, when the engine speed $N_E$ needs to be increased while the vehicle is driven, the hybrid control device 84 increases the first-motor rotational speed $N_{M1}$ while maintaining the second-motor rotational speed $N_{M2}$, which depends on the vehicle speed V (the rotational speed of drive wheels 34), to a substantially constant value. When the engine speed $N_E$ needs to be maintained at a substantially constant value during the shift of the automatic shift portion 20, the hybrid control device 84 increases the first-motor rotational speed $N_{M1}$ if the second-motor rotational speed $N_{M2}$ is decreased by the shift of the automatic shift portion 20 and the change in the vehicle speed V, and decreases the first-motor rotational speed $N_{M1}$ if the second-motor rotational speed $N_{M2}$ is increased by the shift of the automatic shift portion 20 and the change in the vehicle speed V, while maintaining the engine speed $N_E$ at a substantially constant value.

Also, the hybrid control device 84 has a function of executing an output control for the engine 8 so that the engine 8 generates the required output, by outputting at least one of the instruction for controlling opening/closing of the electronic throttle valve 62 using the throttle actuator 64, the instruction for controlling the amount of fuel injected by the fuel injection device 66, and the timing at which fuel is injected by the fuel injection device 66, and the instruction for controlling the timing at which the fuel is ignited by the ignition device 68 such as the igniter, to the engine output control device 58.

For example, the hybrid control device 84 basically executes a throttle control to drive the throttle actuator 64 based on the accelerator-pedal operation amount Acc according to a prestored relation (not shown). That is, the hybrid control device 84 basically executes the throttle control to increase the throttle-valve opening amount $θ_{TH}$ as the accelerator-pedal operation amount Acc increases. The engine output control device 58 controls the engine torque, for example, by controlling the opening/closing of the electronic throttle valve 62 using the throttle actuator 64, controlling the fuel injection performed by the fuel injection device 66, and controlling the timing at which the fuel is ignited by the ignition device 68 such as the igniter, according to the instruction provided by the hybrid control device 84.

Also, the hybrid control device 84 can drive the vehicle in a motor-driven mode, using the electric CVT function (differential action) of the differential portion 11, regardless of whether the engine 8 is stopped or idling.

For example, the hybrid control device 84 determines whether the vehicle condition is in the motor-driven region or the engine-driven region, based on the vehicle condition indicated by the actual vehicle speed V and the required torque $T_{OUT}$ output from the automatic shift portion 20, using a prestored relational diagram (a driving power source switching diagram, a driving power source map) as shown in FIG. 8. In the relational diagram, the vehicle speed V and the required torque $T_{OUT}$ output from the automatic shift portion 20 are used as parameters. The relational diagram shown in FIG. 8 includes a boundary line between the engine-driven region and the motor-driven region, which is provided to switch the driving power source for starting and driving the vehicle between the engine 8 and the second motor M2. Then, the hybrid control device 84 drives the vehicle in the motor-driven mode or the engine driven mode. For example, the driving power source switching diagram indicated by the solid line A in FIG. 8 is prestored, along with the shift map indicated by the solid lines and chain lines in FIG. 8. As evident from FIG. 8, for example, the hybrid control device 84 drives the vehicle in the motor-driven mode in a low output torque $T_{OUT}$ region, that is, in a low engine torque $T_E$ region where the engine efficiency is generally lower than that in a high torque region, or in a low vehicle speed region where the vehicle speed V is low, that is, a low load region.

When the vehicle is driven in the motor-driven mode, the hybrid control device 84 executes the control to suppress the drag of the engine 8 that is stopped, and to improve fuel efficiency. That is, when the vehicle is driven in the motor-driven mode, the hybrid control device 84 controls the first motor M1 so that the first-motor rotational speed $N_{M1}$ is a negative value, for example, the hybrid control device 84 places the first motor M1 in a no-load state so that the first motor M1 is idling, thereby maintaining the engine speed $N_E$ at zero or substantially zero using the electric CVT function (differential action) of the differential portion 11, as required.

The hybrid control device 84 includes an engine start/stop control device 86 that switches the state of the engine 8 between an operating state and a stopped state, that is, starts/stops the engine 8 to switch the drive mode between the engine-driven mode and the motor-driven mode. The engine start/stop control device 86 starts or stops the engine 8 when the hybrid control device 84 determines that the drive mode needs to be switched between he motor-driven mode and the engine-driven mode based on the vehicle condition, for example, using the driving power source switching diagram in FIG. 8.

For example, when the required output torque $T_{OUT}$ is increased due to the operation of depressing the accelerator pedal as shown by the solid line arrow B from the point "a" to the point "b" in FIG. 8, and the hybrid control device 84 determines that the vehicle condition is brought from the motor-driven region to the engine-driven region, and therefore determines that the drive mode needs to be switched from the motor-driven mode to the engine-driven mode, that is, when the hybrid control device 84 determines that the engine 8 needs to be started, the engine start/stop control device 86 starts the engine 8 to switch the drive mode from the motor-driven mode to the engine-driven mode, by executing an engine speed control and an engine torque generation control. The engine speed control increases the engine speed $N_E$ to a predetermined engine speed $N_E'$ at which the engine 8 is completely self-operating, or higher by supplying electric power to the first motor M1 and increasing the first-motor rotational speed $N_{M1}$, i.e., by making the first motor M1 function as the starter. The engine torque generation control generates the engine torque $T_E$ by supplying (injecting) the fuel from the fuel injection device 66, and igniting the fuel using the ignition device 68 at the predetermined engine speed $N_E'$ or higher, for example, at the engine speed $N_E$ which is equal to or above an idling speed, and at which the engine 8 is substantially self-operating.

When the required output torque $T_{OUT}$ is decreased due to the release of the accelerator pedal as shown by the solid line arrow B from the point "b" to the point "a", and the hybrid control device 84 determines that the vehicle condition is brought from the engine-driven region to the motor-driven region, and therefore determines that the drive mode needs to be switched from the engine-driven mode to the motor driven mode, that is, when the hybrid control device 84 determines that the engine 8 needs to be stopped, the engine start/stop control device 86 stops the engine 8 to switch the drive mode from the engine-driven mode to the motor-driven mode, by stopping the fuel injection device 66 from supplying the fuel, that is, by cutting off the fuel supply.

Even when the vehicle is driven in the engine-driven mode, the hybrid control device 84 can perform a so called torque-assist operation to assist the engine 8, by supplying the electric energy to the second motor M2 from the first motor M1 via the electric path, and/or from the electric power storage device 56, and by driving the second motor M2 to apply torque to the drive wheels 34.

Also, the hybrid control device 84 can place the first motor M1 in a no-load state to permit the first motor M1 to idle. In this case, torque cannot be transmitted in the differential portion 11, that is, the transmission of power is substantially interrupted in the power transmission path in the differential portion 11, and no output is generated from the differential portion 11. That is, the hybrid control device 84 can place the differential portion 11 in the neutral state so that the transmission of power is electrically interrupted in the power transmission path in the differential portion 11, by placing the first motor M1 in the no-load state.

When the vehicle is driven in the motor-driven mode, the accelerator pedal may be depressed so that the required output torque Tour is increased, and accordingly the vehicle condition is brought from the motor-driven region to the engine-driven region. In this case, the engine start/stop control device 86 starts the engine 8, and the drive mode is switched from the motor-driven mode to the engine-driven mode, as described above. At this time, if the stepped shift control device 82 determines that a downshift of the automatic shift portion 20 needs to be performed, as a result of the increase in the required output torque $T_{OUT}$, a power-on downshift is performed at the same time. For example, if the required output torque $T_{OUT}$ is increased from the point "a" to the point "b" in FIG. 8 due to the operation of depressing the accelerator pedal when the vehicle is driven in the motor-driven mode, the hybrid control device 84 may determine that the engine 8 needs to be started, and the stepped shift control device 82 may determine that the power-on downshift of the automatic shift portion 20 from the second gear to the first gear needs to be performed, at the same time.

In the case where the engine start/stop control device 86 executes an engine start control so that the engine 8 is started, and the stepped shift control device 82 executes a shift control so that the power-on downshift of the automatic shift portion 20 is performed at the same time, the engine start control and the shift control need to be executed taking into account, for example, the generation of engine torque during the downshift. As a result, these controls are made complicated. Therefore, shift shock and engine start shock may be increased.

Particularly, in the case where the differential portion 11 and the automatic shift portion 20 are provided as in the embodiment, the power transmission path from the transmitting member 18 to the drive wheels 34 is temporarily placed in the power-transmission interrupted state or the substantial power-transmission interrupted state due to the clutch-to-clutch shift of the automatic shift portion 20. During the clutch-to-clutch shift, reaction torque that is transmitted from the drive wheels 34 and borne by the transmitting member 18 is decreased. That is, the reaction force, which is borne by the transmitting member 18 (the first ring gear R1) to increase the engine speed $N_E$ using the first motor M1, is decreased. Thus, when the engine start/stop control device 86 starts the engine 8, it is necessary to maintain torque balance between the elements of the differential portion 11, for example, the reaction torque borne by the first ring gear R1 while controlling the engine speed $N_E$. This makes the controls more complicated. Thus, the shift shock or the engine start shock may be further increased.

In the case where the engine start/stop control device 86 executes the engine start control so that the engine 8 is started after the stepped shift control device 82 completes the shift control, or in the case where the stepped shift control device 82 executes the shift control so that the power-on downshift is performed after the engine start/stop control device 86 completes the engine start control, the period, from when the accelerator pedal is depressed until when the engine torque is generated, and the required torque $T_{OUT}$ is output from the automatic shift portion 20, is increased (i.e., the sum of the period required to perform the shift and the period required to start the engine 8 is increased). This may deteriorate acceleration feeling.

Accordingly, the engine start/stop control device 86 starts the engine 8 by executing the engine speed control during the shift of the automatic shift portion 20, and executing the engine torque generation control after the shift of the automatic shift portion 20 is completed, in the case where it is determined that the period during which the shift of the automatic shift portion 20 is performed overlaps the period during which the engine 8 is started.

More specifically, a shift progress determination device 88 determines whether the shift of the automatic shift portion 20 is being performed. For example, during the period from when the stepped shift control device 82 determines that the shift of the automatic shift portion 20 needs to be performed until the inertia phase of the shift of the automatic shift portion 20 is completed, the shift progress determination device 88 determines that the shift of the automatic shift portion 20 is being performed. When the inertia phase is completed, the shift progress determination device 88 determines that the shift of the automatic shift portion 20 is completed. It is determined whether the inertia phase is completed, for example, based on whether a difference between the actual second-motor rotational speed $N_{M2}$ (that is equal to the transmitting-member rotational speed $N_{18}$) during the inertia phase and the estimated value of the second-motor rotational speed $N_{M2}$ after the shift is completed (=the output-shaft rotational speed $N_{OUT}$×the speed ratio γ at the gear after the shift of the automatic shift portion 20 is completed) is equal to or below a predetermined value, that is, the actual second-motor rotational speed $N_{M2}$ substantially matches the estimated value of the second-motor rotational speed $N_{M2}$ after the shift is completed. Alternatively, it is determined whether the inertia phase is completed, for example, based on whether the amount of change in the actual second motor-rotational speed $N_{M2}$ during the inertia phase is smaller than a predetermined amount. The predetermined amount is empirically determined and set in advance, and is used to determine that the automatic shift portion 20 is in the inertia phase.

In the case where the stepped shift control device 82 determines that the power-on downshift of the automatic shift portion 20 needs to be performed, and the hybrid control device 84 determines that the engine 8 needs to be started, that is, in the case where it is determined that the period during which the power-on downshift is performed overlaps the period during which the engine 8 is started when the vehicle is driven in the motor-driven mode, the engine start/stop control device 86 starts the engine 8 by executing the engine speed control to increase the engine speed $N_E$ to the predetermined engine speed $N_E'$ or higher, during the power-on downshift of the automatic shift portion 20 performed by the shift control executed by the stepped shift control device 82, and executing the engine torque generation control to generate the engine torque $T_E$ when the shift progress determination device 88 determines that the shift of the automatic shift portion 20 is completed.

Figure 10:
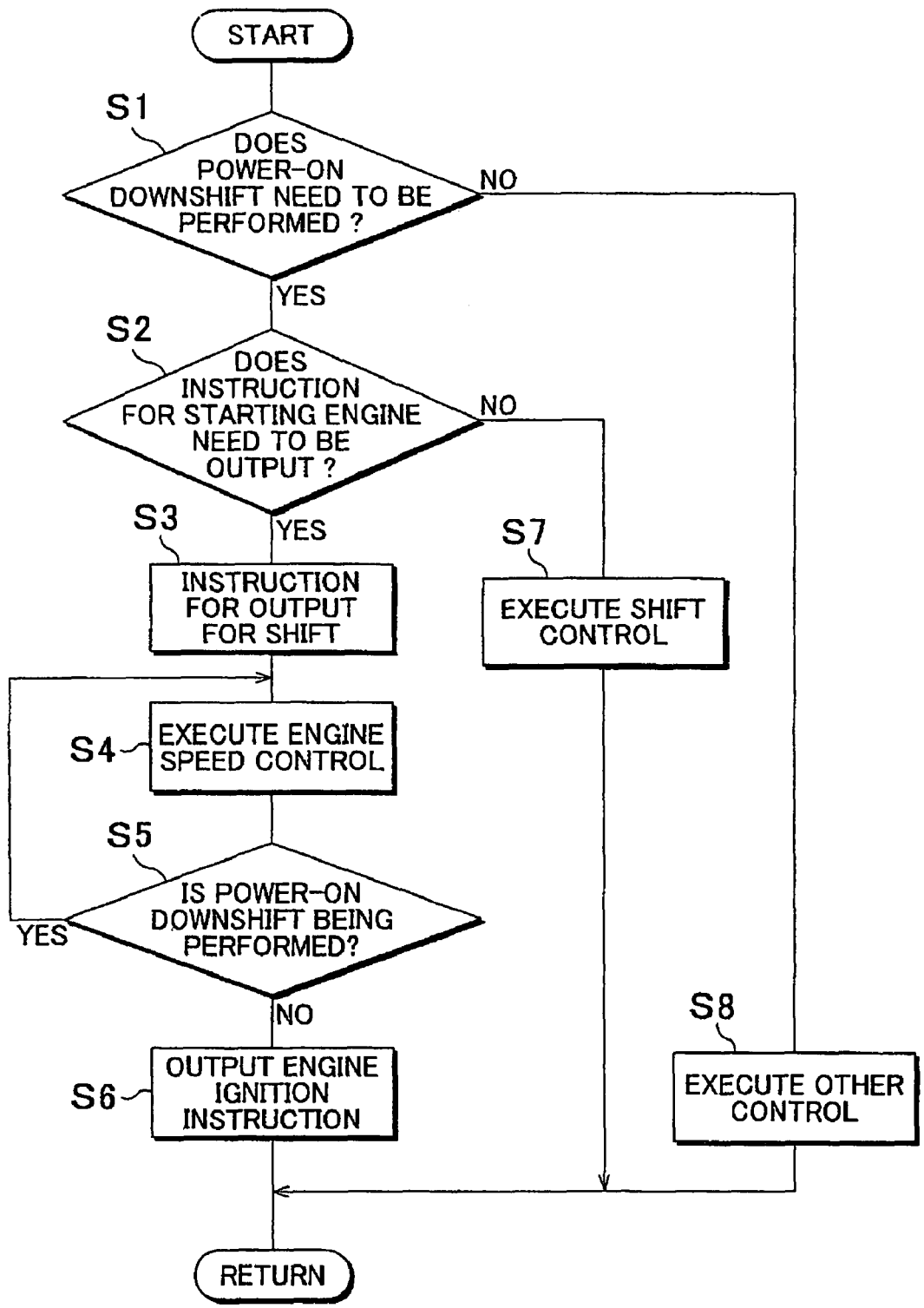
FIG. 10 is a flowchart explaining a control operation performed by an electronic control unit in FIG. 4, that is, the control operation for suppressing shock due to the start of an engine and quickly generating engine torque in the case where it is determined that the period during which the shift of an automatic shift portion is performed overlaps the period during which the engine is started.
Figure 11:
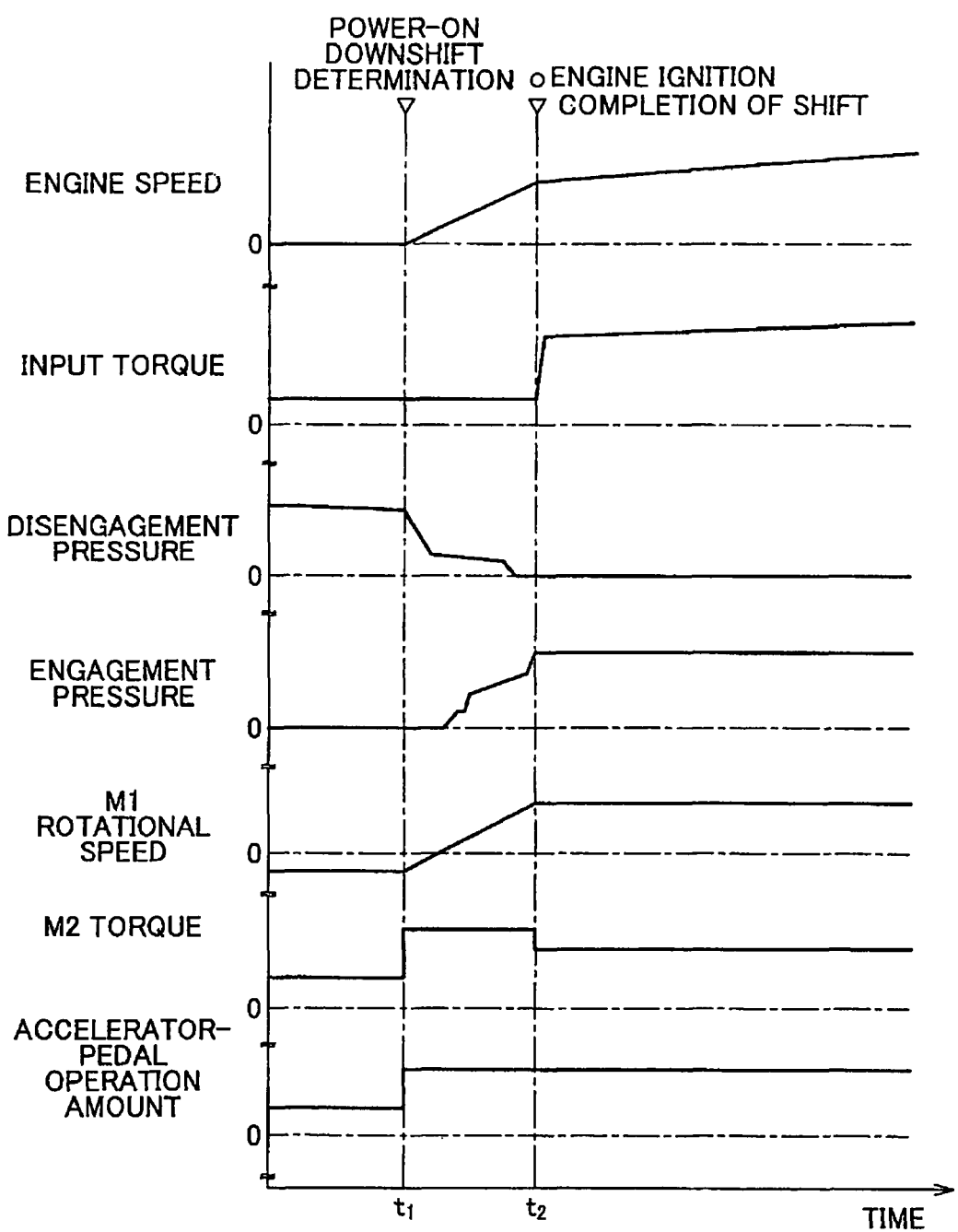
FIG. 11 is a time chart explaining the control operation shown in the flowchart in FIG. 10.

FIG. 10 is a flowchart explaining the main part of a control operation performed by the electronic control unit 80, that is, the control operation for suppressing shock due to the start of the engine and quickly generating the engine torque in the case where it is determined that the period during which the shift of the automatic shift portion 20 is performed overlaps the period during which the engine 8 is started. The control operation is performed in an extremely short cycle time of, for example, approximately several msec to several tens of msec, and is repeatedly performed. FIG. 11 is an example of a time chart explaining the control operation shown in the flowchart in FIG 10.

In FIG. 10, first, in step S1 corresponding to the stepped shift control device 82, for example, it is determined whether the power-on downshift of the automatic shift portion 20 needs to be performed based on the vehicle condition indicated by the actual vehicle speed V and the required torque $T_{OUT}$ output from the automatic shift portion 20, using a shift map as shown in FIG. 8. That is, it is determined whether the power-on downshift of the automatic shift portion 20 needs to be performed due to the operation of depressing the accelerator pedal.

When a negative determination is made in step S1, a control other than the control relating to the power-on downshift of the automatic shift portion 20 is executed in step S8. Alternatively, the routine is finished.

When an affirmative determination is made in step S1, for example, it is determined whether the vehicle condition indicated by the actual vehicle speed V and the required torque $T_{OUT}$ output from the automatic shift portion 20 is brought from the motor-driven region to the engine-driven region using a driving power source switching diagram as shown in FIG. 8, and it is determined whether the drive mode needs to be switched from the motor-driven mode to the engine-driven mode, in step S2 corresponding to the hybrid control device 84. That is, it is determined whether the engine 8 needs to be started (i.e., instruction for starting the engine 8 needs to be output).

When a negative determination is made in step S2, the power-on downshift of the automatic shift portion 20 is performed according to the determination made in step S1, in step S7 corresponding to the stepped shift control device 82 and the hybrid control device 84. For example, the speed ratio γ0 of the differential portion 11 is controlled taking into account the gear of the automatic shift portion 20, and thus the total speed ratio γT is continuously controlled in a range in which the total speed ratio γT can be changed so that the engine 8 is operated along the optimum fuel efficiency curve of the engine 8 as shown by the dash line in FIG. 9.

When an affirmative determination is made in step S2, an instruction for output for shift is output to the hydraulic control circuit 70 to perform the power-on downshift of the automatic shift portion 20 according to the determination made in step S1, in step S3 corresponding to the stepped shift control device 82. That is, a hydraulic pressure instruction is output to the hydraulic control circuit 70 to disengage the disengagement-side engagement device relating to the power-on downshift of the automatic shift portion 20 and to engage the engagement-side engagement device relating to the power-on downshift, thereby performing the clutch-to-clutch shift, in step S3 corresponding to the stepped shift control device 82.

Subsequently to step S3, in, step S4 corresponding to the engine start/stop control device 86, the engine speed control is executed during the power-on downshift of the automatic shift portion 20, and thus the engine speed $N_E$ is increased to the predetermined engine speed $N_E'$ (for example, the engine speed $N_E$ which is equal to or above the idling speed, and at which required engine torque is obtained, i.e., the engine speed $N_E$ when the engine is driven) or higher, using the first motor M1.

Next, in step S5 corresponding to the shift progress determination device 88, it is determined whether the power-on downshift of the automatic shift portion 20 is being performed.

When an affirmative determination is made in step S5, the routine returns to step S4. When it is determined that the power-on downshift of the automatic shift portion 20 is completed, that is, a negative determination is made in step S5, the engine torque generation control is executed in step S6 corresponding to the engine start/stop control device 86. For example, an engine ignition instruction is output to the engine output control device 58 so that the fuel injection device 66 injects the fuel, and the ignition device 68 ignites the fuel at the predetermined engine speed $N_E'$ or higher. Thus, the engine torque $T_E$ is generated.

In FIG. 11, at time point $t_1$, it is determined that the power-on downshift needs to be performed due to the operation of depressing the accelerator pedal when the vehicle is driven in the motor-driven mode using the second motor M2 as the driving power source, and it is determined that the vehicle condition is brought from the motor-driven region to the engine-driven region, and thus, it is determined that the drive mode needs to be switched from the motor-driven mode to the engine-driven mode. Thus, at time point $t_1$, the hydraulic pressure instruction (the disengagement pressure and the engagement pressure in FIG. 11) is output to perform the power-on downshift of the automatic shift portion 20, and thus, the clutch-to-clutch shift is started. In addition, at time point $t_1$, the engine speed control is started to increase the engine speed $N_E$ that is maintained at substantially zero when the vehicle is driven in the motor-driven mode. The engine speed control increases the engine speed $N_E$ using the first motor M1.

During the period from time point $t_1$ to time point $t_2$, the clutch-to-clutch shift is being performed, and the engine speed $N_E$ is increased toward the predetermined engine speed $N_E'$ during the shift During the period front time point $t_1$ to time point $t_2$, the assist torque $T_{M2}$ of the second motor M2 is increased according to the operation of depressing the accelerator pedal. In addition, the torque, which is equivalent to the reaction torque that should be borne by the first ring gear R1 to increase the engine speed $N_E$ using the first motor M1, is added to the assist torque $T_{M2}$ of the second motor M2, because the reaction torque transmitted from the drive wheels 34 and borne by the transmitting member 18 (the first ring gear R1) is decreased.

At time point $t_2$, the clutch-to-clutch shift is completed. The drive wheels 34 are mechanically connected to the first ring gear R1 due to the completion of the clutch-to-clutch shift. At time point $t_2$, where the engine speed $N_E$ is equal to the predetermined engine speed $N_E'$ or higher, the engine torque generation control is executed immediately after the completion of the clutch-to-clutch shift. The engine torque generation control generates the engine torque $T_E$, by injecting the fuel from the fuel injection device 66, and igniting the fuel using the ignition device 68.

Thus, when the clutch-to-clutch shift is started, the process of starting the engine 8 is started. During the clutch-to-clutch shift, the engine speed $N_E$ is increased to the predetermined engine speed $N_E'$ or higher. When the shift is completed, the engine speed $N_E$ is equal to the predetermined engine speed $N_E'$ or higher. Therefore, immediately after the shift is completed, the engine torque generation control is executed.

Thus, for example, as compared to the case where the process of starting the engine 8 is started after the shift of the automatic shift portion 20 is completed, or the case where the shift of the automatic shift portion 20 is started after the engine 8 is started, the total period required to perform the shift of the automatic shift portion 20 and to start the engine 8 is decreased. That is, it is possible to prevent time delay relating to the generation of the required output torque $T_{OUT}$ in the case where it is determined that the period during which the shift of the automatic shift portion 20 is performed overlaps the period during which the engine 8 is started. Also, the engine torque generation control is not executed, and therefore, the engine torque $T_E$ is not actually generated until the shift of the automatic shift portion 20 is completed, and the first ring gear R1 is mechanically able to bear the reaction force generated by the ignition in the engine 8 (i.e., the reaction force generated by generation of the engine torque). In other words, during the shift of the automatic shift portion 20, it is necessary to take into account only that the torque, which is equivalent to the reaction torque that should be borne by the first ring gear R1 to execute the engine speed control, is constantly added to the assist torque $T_{M2}$ of the second motor M2. Therefore, as compared to the case where the engine torque generation control is executed during the shift of the automatic shift portion 20, the engine speed control, and the control of the torque, such as the assist torque $T_{M2}$ and the engagement torque of the automatic shift portion 20, are easily executed when the engine 8 is started.

As described above, in the embodiment, in the case where it is determined that the period during which the shift of the automatic shift portion 20 is performed overlaps the period during which the engine 8 is started, the engine start/stop control device 86 starts the engine 8 by executing the engine speed control during the shift of the automatic shift portion 20, and executing the engine torque generation control after the shift of the automatic shift portion 20 is completed. Therefore, although the engine speed $N_E$ is increased to the predetermined engine speed $N_E'$ or higher during the shift of the automatic shift portion 20, the engine torque $T_E$ is generated after the shift is completed. Thus, it is possible to suppress the shock due to the start of the engine, and to quickly generate the engine torque For example, the shift of the automatic shift portion 20 is the power-on-downshift. Therefore, although the engine speed $N_E$ is increased to the predetermined engine speed $N_E'$ or higher during the power-on downshift of the automatic shift portion 20, the engine torque $T_E$ is generated after the power-on downshift is completed. Thus, it is possible to suppress the shock due to the start of the engine, and to improve the acceleration feeling.

Also, in the embodiment, during the shift of the automatic shift portion 20, the transmission of power is interrupted or reduced in the power transmission path from the transmitting member 18 to the drive wheels 34, that is, the power transmission path is temporarily placed in the power-transmission interrupted state or the substantial power-transmission interrupted state. Therefore, the influence of the shift of the automatic shift portion 20 does not need to be taken into account in the engine speed control. Thus, the engine speed control is easily executed. Also, the engine torque generation control is not executed, and therefore, the engine torque $T_E$ is not actually generated until the shift of the automatic shift portion 20 is completed, and the power transmission path from the transmitting member 18 to the drive wheels 34 is placed in the *power-transmission permitted state, and thus, the first ring gear R1 is mechanically able to bear the reaction force generated by the ignition in the engine 8 (i.e., the reaction force generated by generation of the engine torque). In other words, during the shift of the automatic shift portion 20, it is necessary to take into account only the torque that is equivalent to the reaction torque that should be borne by the first ring gear R1 to execute the engine speed control. Therefore, as compared to the case where the engine torque generation control is executed during the shift of the automatic shift portion 20, the engine speed control, and the torque control are easily executed at the time of engine start.

In the embodiment, the predetermined engine speed $N_E'$ is a self-operating speed at which the engine 8 is completely self-operating. Therefore, immediately after the ignition is performed in the engine 8, the engine 8 is driven further more stably, and thus, the predetermined engine torque $T_E$ is quickly generated.

In the embodiment, the shift of the automatic shift portion 20 is the clutch-to-clutch shift. Because the engine torque $T_E$ is not generated during the clutch-to-clutch shift, the shift control is easily executed. Also, during the clutch-to-clutch shift, the reaction torque borne by the transmitting member 18 (the first ring gear R1) is decreased, and it is difficult to suppress the shock due to the start of the engine 8. Therefore, only the engine speed control, which is executed relatively easily, is executed during the clutch-to-clutch shift, and the engine torque generation control is executed after the clutch-to-clutch shift is completed. Thus, it is possible to suppress the shock due to the start of the engine 8, and to quickly generate the engine torque.

Although the embodiment of the invention has been described in detail with reference to the drawings, the invention may be applied to other embodiments.

For example, in the above-described embodiment, the vehicular drive apparatus is the shift mechanism 10 that includes the differential portion 11 and the automatic shift portion 20 that functions as the shift portion. However, the invention is not limited to the configuration. The invention may be applied to any vehicular drive apparatus, as long as the vehicular drive apparatus includes at least the shift portion, and the shift of the shift portion is performed when the vehicle is driven in the motor-driven mode using the motor.

In the above-described embodiment, the shift progress determination device 88 determines that the shift of the automatic shift portion 20 is being performed until the inertia phase is completed, and determines that the shift is completed when the inertia phase is completed. However, the method of determining the progress of the shift is not limited to this method. It may be determined whether the shift of the automatic shift portion 20 is being performed using various methods. For example, the shift progress determination device 88 may determine whether the shift is completed based on whether the hydraulic pressure instruction for engaging and/or disengaging the hydraulic frictional engagement devices related to the shift of the automatic shift portion 20 performed by the stepped shift control device 82 is equal to a predetermined value used to determine that the shift is completed.

In the above-described embodiment, as shown in FIG. 11, at time point $t_2$ where the engine speed $N_E$ is equal to the predetermined engine speed $N_E'$ or higher, the engine torque generation control is executed, and thus the engine torque $T_E$ is generated immediately after the clutch-to-clutch is completed. However, the engine torque generation control may be executed when a predetermined time has elapsed after the clutch-to-clutch shift is completed. In this case as well, the total period required to perform the shift of the automatic shift portion 20 and to start the engine 8 is decreased to a certain extent, as compared to the case where the engine start control is started after the clutch-to-clutch shift is completed.

In the above-described embodiment, the predetermined engine speed $N_E'$ is the self-operating speed at which the engine 8 is completely self-operating. However, the predetermined engine speed $N_E'$ does not necessarily need to be the self-operating speed. The engine speed $N_E$ may be increased to an engine speed $N_E''$ that is a substantial self-operating speed at which the engine 8 is not completely self-operating, but an engine stall is prevented after ignition is performed, though the engine 8 is driven slightly unstably immediately after the ignition is performed.

In the above-described embodiment, in the process of starting the engine 8 during the clutch-to-clutch shift, the hybrid control device 84 executes the engine speed control that increases the engine speed $N_E$ to the predetermined engine speed $N_E'$ or higher by controlling the first motor M1, and generates the torque equivalent to the reaction torque that should be borne by the first ring gear R1 by controlling the second motor M2. However, because the transmission of power is interrupted or reduced in the power transmission path from the transmitting member 18 to the drive wheels 34 during the clutch-to-clutch shift, the engine speed $N_E$ may be increased to the predetermined engine speed $N_E'$ or higher by controlling the second motor to increase the second-motor rotational speed $N_{M2}$, or the engine speed $N_E$ may be increased to the predetermined engine speed $N_E'$ or higher by controlling the first motor M1 and the second motor M2 to increase the first-motor rotational speed $N_{M1}$ and the second-motor rotational speed $N_{M2}$ during the clutch-to-clutch shift In the above-described embodiment, the differential portion 11 (the power split mechanism 16) functions as the electric CVT in which the speed ratio γ0 is continuously changed from the minimum value γ0min to the maximum value γ0max. However, for example, the invention may be applied to a vehicular drive apparatus that includes the differential portion 11 in which the speed ratio γ0 is changed in a stepwise manner using the differential action, instead of continuously changing the speed ratio γ0.

In the above-described embodiment, the differential portion 11 may include a limited slip differential that is provided in the power split mechanism 16, and that limits the differential action of the differential portion 11 so that the differential portion 11 is operated as a stepped transmission with at least two forward gears. The invention is applied only when the differential-action limitation device does not limit the differential action of the differential portion 11 (the power split mechanism 16), and a vehicle is driven.

Also, in the power split mechanism 16 in the above-described embodiment, the first carrier CA1 is connected to the engine 8, the first sun gear S1 is connected to the first motor M1, and the first ring gear R1 is connected to the transmitting member 18. However, the connection relation is not necessarily limited to this. Each of the engine 8, the first motor M1, and the transmitting member 18 may be connected to any of the three elements CA1, S1, and R1 of the first planetary gear unit 24.

In the above-described embodiment, the engine 8 is directly connected to the input shaft 14. However, for example, the engine 8 may be operatively connected to the input shaft 14 via a gear, a belt, or the like. The engine 8 and the input shaft 14 do not necessarily need to be provided on a common axis.

In the above-described embodiment, the first motor M1 and the second motor M2 are disposed coaxially with the input shaft 14, the first motor M1 is connected to the first sun gear S1, and the second motor M2 is connected to the transmitting member 18. However, the first motor M1 and the second motor M2 do not necessarily need to be provided in this manner. For example, the first motor M1 may be operatively connected to the first sun gear S1 via a gear, a belt, a reducer, or the like, and the second motor M2 may be operatively connected to the transmitting member 18 via a gear, a belt, a reducer, or the like.

In the above-described embodiment, each of the hydraulic frictional engagement devices, such as the first clutch C1 and the second clutch C2, may be a magnetic-particle engagement device such as a magnetic-particle clutch, an electromagnetic engagement device such as an electromagnetic clutch, or a mechanical clutch such as a mesh dog clutch. For example, when the electromagnetic clutch is employed, the hydraulic control circuit 70 is not the valve device that switches the oil passage. Instead, the hydraulic control circuit 70 may be a switching device, an electromagnetic switching device, or the like, which switches the state of an electric instruction signal circuit that provides an electric instruction signal to the electromagnetic clutch.

In the above-described embodiment, the automatic shift portion 20 is provided in the power transmission path between the transmitting member 18, which is the output member of the differential portion 11 (i.e., the power split mechanism 16), and the drive wheels 34. However, other types of shift portions (transmissions) may be provided in the power transmission path. For example, a continuously variable transmission (CVT) that is one of automatic transmissions may be provided. Alternatively, an automatic transmission of a constant mesh parallel two-axes type in which a gear is automatically selected using a select cylinder and a shift cylinder may be provided (although a manual transmission of a constant mesh parallel two-axes type is well known). The invention may be also applied to these cases.

In the above-described embodiment, the automatic shift portion 20 is connected to the differential portion 11 in series via the transmitting member 18. However, the input shaft 14 may be provided in parallel with a counter shaft, and the automatic shift portion 20 may be coaxially provided on the counter shaft. In this case, the differential portion 11 is connected to the automatic shift portion 20 so that power can be transmitted, via a transmitting member set which includes a counter gear pair, a sprocket, and a chain, and which functions as the transmitting member 18.

In the above-described embodiment, the power split mechanism 16, which functions as the differential mechanism, may be a differential gear unit that includes a pinion that is rotated by the engine, and a pair of bevel gears that meshes with the pinion. In this case, the differential gear unit is operatively connected to the first motor M1 and the transmitting member 18 (the second motor M2).

In the above-described embodiment, the power split mechanism 16 includes one planetary gear unit. However, the power split mechanism 16 may include at least two planetary gear units. When the power split mechanism 16 is in the non differential mode (the speed-ratio fixed mode), the power split mechanism 16 may function as a transmission with at least three gears. Each of the at least two planetary gear units is not limited to the single pinion planetary gear unit, and may be a double pinion planetary gear unit.

In the above-described embodiment, the shift operation device 50 includes the shift lever 52 that is operated to select the shift position $P_{SH}$ among the plurality of positions. Instead of the shift lever 52, other devices may be provided. For example, a switch that can select the shift position $P_{SH}$ among the plurality of positions, such as a push-button switch or a slide switch, a device that can switch the shift position $P_{SH}$ among the plurality of positions in response to the voice of the driver, instead of manual operation, or a device that can switch the shift position $P_{SH}$ among the plurality of positions according to foot operation, may be provided. Also, in the above-described embodiment, by moving the shift lever 52 to the position "M", the shift ranges are set. However, the highest gear in each shift range may be set as the gear. In this case, the gear is selected, and the automatic shift portion 20 shifts to the selected gear. For example, when the shift lever 52 is manually moved to an upshift position "+" or a downshift position "−" in the position "M", one of the first gear to the fourth gear is selected in the automatic shift portion 20 according to the movement of the shift lever 52.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A control apparatus for a vehicular drive apparatus that includes a driving power source that includes an engine and a motor, and a shift portion provided in a power transmission path from the driving power source to a drive wheel, the control apparatus comprising:
    a controller that starts the engine by executing an engine speed control that increases an engine speed to a predetermined engine speed or higher, and executing an engine torque generation control that generates engine torque by supplying fuel and igniting the fuel at the predetermined engine speed or higher,
    wherein in a case where the controller determines that a period during which a shift of the shift portion is performed overlaps a period during which the engine is started, the controller starts the engine by executing the engine speed control during the shift of the shift portion, and executing the engine torque generation control after the shift of the shift portion is completed.

2. The control apparatus according to claim 1, wherein in the case where the controller determines that the period during which the shift of the shift portion is performed overlaps the period during which the engine is started, the controller starts the engine by executing the engine torque generation control immediately after the shift of the shift portion is completed.

3. The control apparatus according to claim 1, wherein in the case where the controller determines that the period during which the shift of the shift portion is performed overlaps the period during which the engine is started, the controller starts the engine by executing the engine torque generation control when a predetermined time has elapsed after the shift of the shift portion is completed.

4. The control apparatus according to claim 1, wherein the shift of the shift portion is a power-on downshift.

5. The control apparatus according to claim 1, wherein the shift of the shift portion is performed when a vehicle is driven in a motor-driven mode using only the motor in the driving power source.

6. The control apparatus according to claim 1, wherein transmission of power is interrupted or reduced in the power transmission path during the shift of the shift portion.

7. The control apparatus according to claim 1, wherein the predetermined engine speed is a self-operating speed.

8. The control apparatus according to claim 1, wherein the predetermined engine speed is a substantial self-operating speed.

9. The control apparatus according to claim 1, wherein the shift portion is a stepped automatic transmission, and a clutch-to-clutch shift of the stepped automatic transmission is performed.

10. A control apparatus for a vehicular drive apparatus that includes a differential portion and a shift portion, wherein the differential portion includes a differential mechanism that includes a first element connected to an engine, a second element connected to a first motor, and a third element connected to a transmitting member and a second motor, the differential mechanism distributes output from the engine to the first motor and the transmitting member; and the shift portion is provided in a power transmission path from the transmitting member to a drive wheel, the control apparatus comprising:
 a controller that starts the engine by executing an engine speed control that increases an engine speed to a predetermined engine speed or higher by controlling at least one of the first motor and the second motor, and executing an engine torque generation control that generates engine torque by supplying fuel and igniting the fuel at the predetermined engine speed or higher,
 wherein in a case where the controller determines that a period during which a shift of the shift portion is performed overlaps a period during which the engine is started, the controller starts the engine by executing the engine speed control during the shift of the shift portion, and executing the engine torque generation control after the shift of the shift portion is completed.

11. The control apparatus according to claim 10, wherein in the case where the controller determines that the period during which the shift of the shift portion is performed overlaps the period during which the engine is started, the controller starts the engine by executing the engine torque generation control immediately after the shift of the shift portion is completed.

12. The control apparatus according to claim 10, wherein in the case where the controller determines that the period during which the shift of the shift portion is performed overlaps the period during which the engine is started, the controller starts the engine by executing the engine torque generation control when a predetermined time has elapsed after the shift of the shift portion is completed.

13. The control apparatus according to claim 10, wherein the differential portion is operated as a continuously variable transmission by controlling an operating state of the first motor.

14. The control apparatus according to claim 10, wherein the shift of the shift portion is a power-on downshift.

15. The control apparatus according to claim 10, wherein the shift of the shift portion is performed when a vehicle is driven in a motor-driven mode using only the motor in the driving power source.

16. The control apparatus according to claim 10, wherein transmission of power is interrupted or reduced in the power transmission path during the shift of the shift portion.

17. The control apparatus according to claim 10, wherein the predetermined engine speed is a self-operating speed.

18. The control apparatus according to claim 10, wherein the predetermined engine speed is a substantial self-operating speed.

19. The control apparatus according to claim 10, wherein the shift portion is a stepped automatic transmission, and a clutch-to-clutch shift of the stepped automatic transmission is performed.

20. A control method for a vehicular drive apparatus that includes a driving power source that includes an engine and a motor, and a shift portion provided in a power transmission path from the driving power source to a drive wheel, the control method comprising:
 starting the engine by executing an engine speed control that increases an engine speed to a predetermined engine speed or higher, and executing an engine torque generation control that generates engine torque by supplying fuel and igniting the fuel at the predetermined engine speed or higher,
 wherein in a case where it is determined that a period during which a shift of the shift portion is performed overlaps a period during which the engine is started, the engine is started by executing the engine speed control during the shift of the shift portion, and executing the engine torque generation control after the shift of the shift portion is completed.

21. A control method for a vehicular drive apparatus that includes a differential portion and a shift portion, wherein the differential portion includes a differential mechanism that includes a first element connected to an engine, a second element connected to a first motor, and a third element connected to a transmitting member and a second motor, the differential mechanism distributes output from the engine to the first motor and the transmitting member, and the shift portion is provided in a power transmission path from the transmitting member to a drive wheel, the control method comprising:
 starting the engine by executing an engine speed control that increases an engine speed to a predetermined engine speed or higher by controlling at least one of the first motor and the second motor, and executing an engine torque generation control that generates engine torque by supplying fuel and igniting the fuel at the predetermined engine speed or higher,
 wherein in a case where it is determined that a period during which a shift of the shift portion is performed overlaps a period during which the engine is started, the engine is started by executing the engine speed control during the shift of the shift portion, and executing the engine torque generation control after the shift of the shift portion is completed.

* * * * *